(12) United States Patent
Hsieh et al.

(10) Patent No.: US 12,453,101 B2
(45) Date of Patent: Oct. 21, 2025

(54) PHASE CHANGE MATERIAL SWITCH CIRCUIT FOR ENHANCED SIGNAL ISOLATION AND METHODS OF FORMING THE SAME

(71) Applicant: Taiwan Semiconductor Manufacturing Company Limited, Hsinchu (TW)

(72) Inventors: Wei Ting Hsieh, Hsinchu (TW); Kuo-Ching Huang, Hsinchu (TW); Yu-Wei Ting, Taipei (TW); Kuo-Pin Chang, Zhubei (TW); Hung-Ju Li, Hsinchu (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 215 days.

(21) Appl. No.: 18/321,898

(22) Filed: May 23, 2023

(65) Prior Publication Data

US 2024/0397733 A1    Nov. 28, 2024

(51) Int. Cl.
| | | |
|---|---|---|
| *H10B 63/10* | (2023.01) | |
| *G11C 13/00* | (2006.01) | |
| *H10B 63/00* | (2023.01) | |

(52) U.S. Cl.
CPC ......... *H10B 63/10* (2023.02); *G11C 13/0004* (2013.01); *G11C 13/0069* (2013.01); *H10B 63/80* (2023.02)

(58) Field of Classification Search
CPC .... H10B 63/10; H10B 63/80; G11C 13/0004; G11C 13/0069; G11C 13/003; G11C 2013/008; G11C 2013/0092; H10N 70/823; H10N 70/8613; H10N 79/00; H10N 70/231; H10N 70/8828; H01H 37/02; H03K 17/80

See application file for complete search history.

(56) References Cited

U.S. PATENT DOCUMENTS

| | | | |
|---|---|---|---|
| 2016/0268504 A1* | 9/2016 | Goktepeli | .......... H10N 70/8613 |
| 2020/0058581 A1* | 2/2020 | El-Hinnawy | ........... H01L 23/66 |
| 2020/0058862 A1* | 2/2020 | Howard | ............... H10N 70/011 |
| 2022/0404406 A1* | 12/2022 | Adamski | ............... H10N 70/231 |
| 2023/0090893 A1* | 3/2023 | Erb | ...................... H10N 70/231 333/124 |
| 2024/0106420 A1* | 3/2024 | Dykstra | ................. H03K 17/80 |

* cited by examiner

*Primary Examiner* — Jerome Leboeuf
(74) *Attorney, Agent, or Firm* — The Marbury Law Group, PLLC

(57) ABSTRACT

A device structure includes a first series connection of a first phase change memory (PCM) switch and a second PCM switch. The first PCM switch includes a first heater line, a first PCM line, and a first contact electrode and a second contact electrode located on the first heater line. The second PCM switch includes a second heater line, a second PCM line, and a third contact electrode and a fourth contact electrode located on the second heater line. The second contact electrode is electrically connected to the third contact electrode. The fourth contact electrode is electrically grounded. One of the first contact electrode and the second contact electrode includes an radio-frequency (RF) signal input port. Another of the first contact electrode and the second contact electrode comprises an RF signal output port. The device structure may function as a combination PCM switch that decreases noise level during signal transmission.

20 Claims, 16 Drawing Sheets

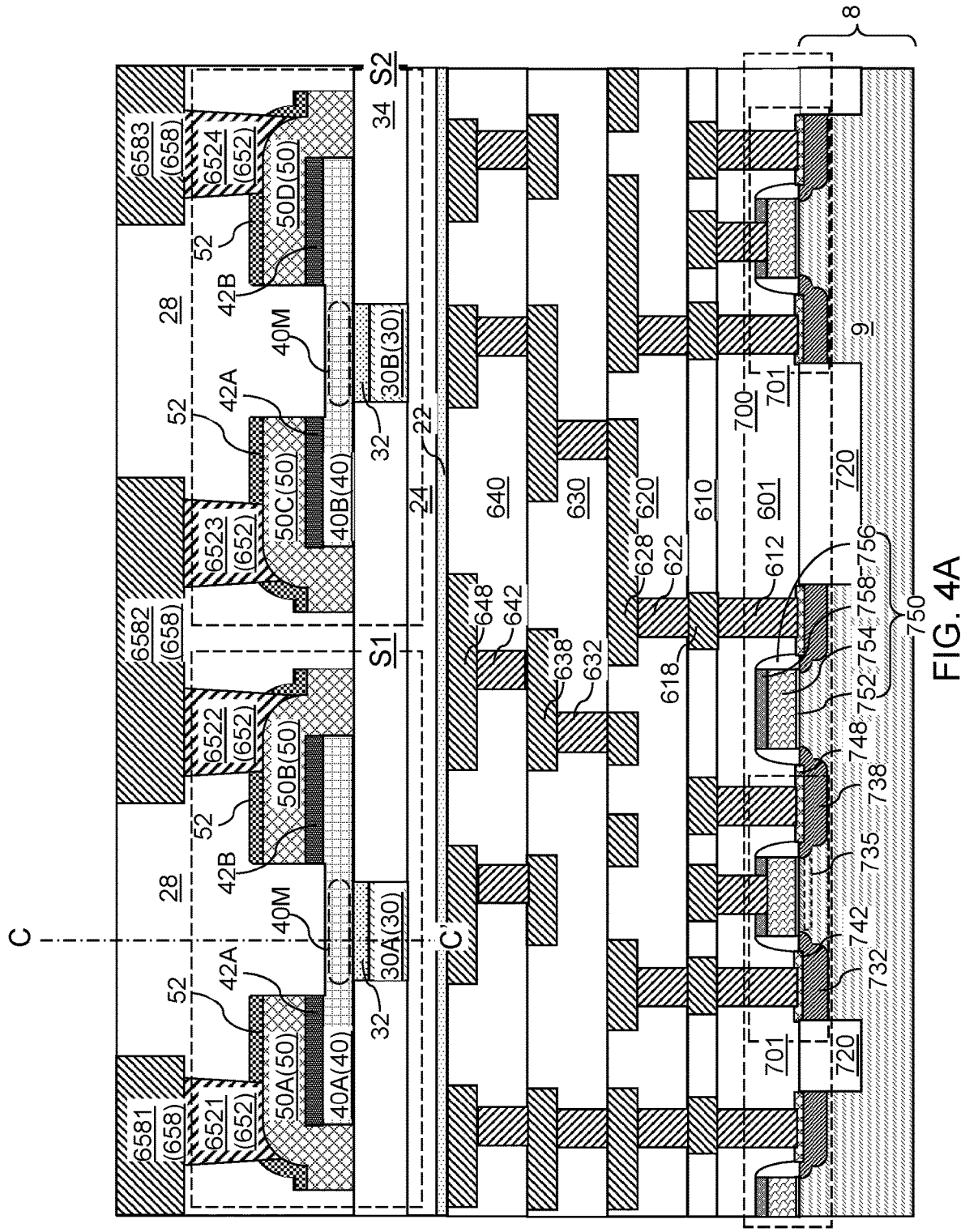

PHASE CHANGE MATERIAL SWITCH CIRCUIT FOR ENHANCED SIGNAL ISOLATION AND METHODS OF FORMING THE SAME

BACKGROUND

Phase change material switches are useful devices that may mitigate interferences from external electromagnetic radiation, and may be used for various applications such as radio-frequency applications. A phase change material switch may provide electrical connection or electrical isolation in the path of radio-frequency signals depending on the resistivity state of a phase change material portion.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 4A-4D are various views of the structure after formation of phase change memory switches and interconnect structures according to an embodiment of the present disclosure. FIG. 4A is a vertical cross-sectional view of the first region of the exemplary structure. FIG. 4B is a top-down view of the first region of the exemplary structure. The vertical plane A-A' is the plane of the vertical cross-section of FIG. 4A. FIG. 4C is a vertical cross-sectional view along the vertical plane C-C' of FIG. 4B. FIG. 4D is a vertical cross-sectional view of the second region of the exemplary structure.

DETAILED DESCRIPTION

Figure 1:
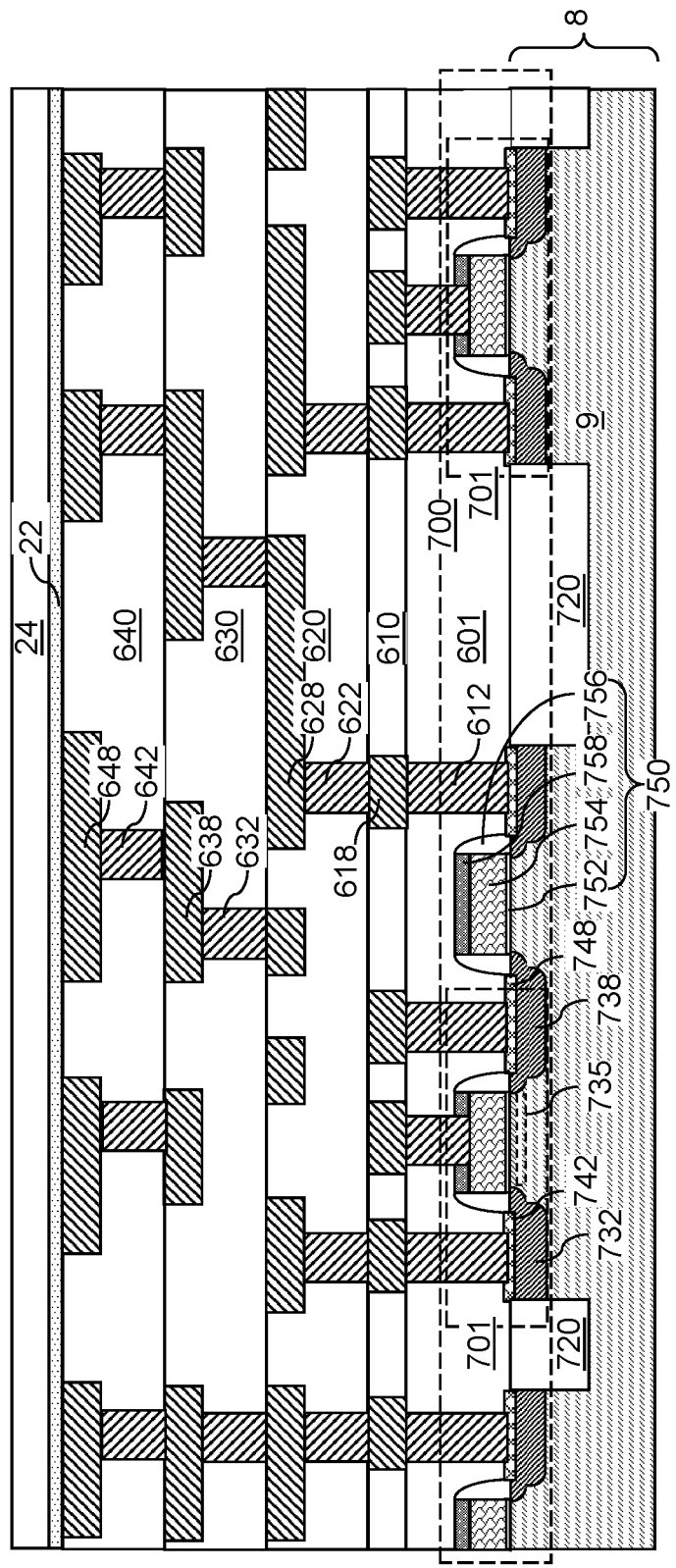
FIG. 1 is a vertical cross-sectional view of a structure after formation of complementary metal-oxide-semiconductor (CMOS) transistors, metal interconnect structures and dielectric material layers, an optional dielectric capping layer, and a dielectric isolation layer according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Elements with the same reference numerals refer to the same element, and are presumed to have the same material composition and the same thickness range unless expressly indicated otherwise.

A phase change memory (PCM) switch (e.g., radio-frequency (RF) switches) may comprise at least one back-end-of-line phase change memory (PCM) cell and a control circuit that controls the electrical current through a heater line in the PCM cell. The control circuit is also referred to as a write circuit or a programming circuit. Depending on the state of the at least one PCM cell, the PCM switch may allow, or block, transmission of a signal (e.g., radio-frequency signal). Parasitic capacitance between the input port and the output port of the switch may cause incomplete decoupling between the input port and the output port of the PCM switch. The present disclosure provides an innovative scheme that reduces parasitic transmission of a signal between the input port and the output port while the PCM switch is turned off.

Generally, the various embodiment structures and methods disclosed herein may be used to provide a phase change material (PCM) switch circuit including a plurality of PCM switches. Specifically, at least one series connection of two PCM switches may be used to provide enhanced noise isolation between an input port and an output port of the PCM switch circuit. One end of each series connection may be electrically grounded (i.e., electrically connected to a ground node). The other end of each series connection may be used as a signal input port or as a signal output port. The middle node of each series connection may be used as a signal output port or as a signal input port. The two PCM switches in each series connection may be complementarily operated such that one PCM switch is on (i.e., closed) while the other is off (i.e., opened), or vice versa. In instances in which the PCM switch circuit is in an off state, any input signal may be routed to the electrical ground node through one of the PCM switches, thereby reducing the coupling between the input port and the output port. Such a condition may also increase the signal-to-noise ratio of the PCM switch circuit. The various embodiments of the present disclosure are now described with reference to accompanying drawings.

Referring to FIG. 1, a structure according to an embodiment of the present disclosure is illustrated. The structure includes a substrate 8, which may be a semiconductor substrate such as a commercially available silicon substrate. The substrate 8 may include a semiconductor material layer 9 at least at an upper portion thereof. The semiconductor material layer 9 may be a surface portion of a bulk semiconductor substrate, or may be a top semiconductor layer of a semiconductor-on-insulator (SOI) substrate. In one embodiment, the semiconductor material layer 9 includes a single crystalline semiconductor material such as single crystalline silicon. In one embodiment, the substrate 8 may include a single crystalline silicon substrate including a single crystalline silicon material.

Shallow trench isolation structures 720 including a dielectric material such as silicon oxide may be formed in an upper portion of the semiconductor material layer 9. Suitable doped semiconductor wells, such as p-type wells and n-type wells, may be formed within each area that is laterally enclosed by a portion of the shallow trench isolation structures 720. Field effect transistors 701 may be formed over the top surface of the semiconductor material layer 9. For example, each field effect transistor 701 may include a source contact electrode 732, a drain contact electrode 738, a semiconductor channel 735 that includes a surface portion of the substrate 8 extending between the source contact electrode 732 and the drain contact electrode 738, and a gate structure 750. The semiconductor channel 735 may include a single crystalline semiconductor material. Each gate structure 750 may include a gate dielectric layer 752, a gate contact electrode 754, a gate cap dielectric 758, and a dielectric gate spacer 756. A source-side metal-semiconductor alloy region 742 may be formed on each source contact electrode 732, and a drain-side metal-semiconductor alloy region 748 may be formed on each drain contact electrode 738. The devices formed on the top surface of the semiconductor material layer 9 may include complementary metal-oxide-semiconductor (CMOS) transistors and optionally additional semiconductor devices (such as resistors, diodes, capacitor structures, etc.), and are collectively referred to as CMOS circuitry 700.

One or more of the field effect transistors 701 in the CMOS circuitry 700 may include a semiconductor channel 735 that contains a portion of the semiconductor material layer 9 in the substrate 8. In embodiments in which the semiconductor material layer 9 includes a single crystalline semiconductor material such as single crystalline silicon, the semiconductor channel 735 of each field effect transistor 701 in the CMOS circuitry 700 may include a single crystalline semiconductor channel such as a single crystalline silicon channel. In one embodiment, a subset of the field effect transistors 701 in the CMOS circuitry 700 may include a respective node that is subsequently electrically connected to a node of an energy harvesting device and/or to a battery structure to be subsequently formed.

In one embodiment, the substrate 8 may include a single crystalline silicon substrate, and the field effect transistors 701 may include a respective portion of the single crystalline silicon substrate as a semiconducting channel. As used herein, a "semiconducting" element refers to an element having electrical conductivity in the range from $1.0 \times 10^{-6}$ S/cm to $1.0 \times 10^5$ S/cm. As used herein, a "semiconductor material" refers to a material having electrical conductivity in the range from $1.0 \times 10^{-6}$ S/cm to $1.0 \times 10^5$ S/cm in the absence of electrical dopants therein, and is capable of producing a doped material having electrical conductivity in a range from 1.0 S/cm to $1.0 \times 10^5$ S/cm upon suitable doping with an electrical dopant.

Various metal interconnect structures formed within dielectric material layers may be subsequently formed over the substrate 8 and the semiconductor devices 701 thereupon (such as field effect transistors). In an illustrative example, the dielectric material layers may include, for example, a first dielectric material layer 601 that may be a layer that surrounds the contact structure connected to the source and drains (sometimes referred to as a contact-level dielectric material layer 601), a first interconnect-level dielectric material layer 610, a second interconnect-level dielectric material layer 620, a third interconnect-level dielectric material layer 630, and a fourth interconnect-level dielectric material layer 640. The metal interconnect structures may include device contact via structures 612 formed in the first dielectric material layer 601 and contact a respective component of the CMOS circuitry 700, first metal line structures 618 formed in the first interconnect-level dielectric material layer 610, first metal via structures 622 formed in a lower portion of the second interconnect-level dielectric material layer 620, second metal line structures 628 formed in an upper portion of the second interconnect-level dielectric material layer 620, second metal via structures 632 formed in a lower portion of the third interconnect-level dielectric material layer 630, third metal line structures 638 formed in an upper portion of the third interconnect-level dielectric material layer 630, third metal via structures 642 formed in a lower portion of the fourth interconnect-level dielectric material layer 640, and fourth metal line structures 648 formed in an upper portion of the fourth interconnect-level dielectric material layer 640. While the present disclosure is described using an embodiment in which four levels metal line structures are formed in dielectric material layers, embodiments are expressly contemplated herein in which a lesser or greater number of levels of metal line structures are formed in dielectric material layers.

Each of the dielectric material layers (601, 610, 620, 630, 640) may include a dielectric material such as undoped silicate glass, a doped silicate glass, organosilicate glass, amorphous fluorinated carbon, porous variants thereof, or combinations thereof. Each of the metal interconnect structures (612, 618, 622, 628, 631, 638, 642, 648) may include at least one conductive material, which may be a combination of a metallic liner (such as a metallic nitride or a metallic carbide) and a metallic fill material. Each metallic liner may include TiN, TaN, WN, TIC, TaC, and WC, and each metallic fill material portion may include W, Cu, Al, Co, Ru, Mo, Ta, Ti, alloys thereof, and/or combinations thereof. Other suitable metallic liner and metallic fill materials within the contemplated scope of disclosure may also be used. In one embodiment, the first metal via structures 622 and the second metal line structures 628 may be formed as integrated line and via structures by a dual damascene process. Generally, any contiguous set of a metal line structure (628, 638, 648) and at least one underlying metal via structure (622, 632, 642) may be formed as an integrated line and via structure.

Generally, semiconductor devices 701 may be formed on a substrate 8, and metal interconnect structures (612, 618, 622, 628, 631, 638, 642, 648) and dielectric material layers (601, 610, 620, 630, 640) over the semiconductor devices 701. The metal interconnect structures (612, 618, 622, 628, 631, 638, 642, 648) may be formed in the dielectric material layers (601, 610, 620, 630, 640), and may be electrically connected to the semiconductor devices.

An optional dielectric capping layer 22 and a dielectric isolation layer 24 may be deposited over the metal interconnect structures (612, 618, 622, 628, 631, 638, 642, 648) and dielectric material layers (601, 610, 620, 630, 640). The optional dielectric capping layer 22 includes a dielectric capping material such as silicon carbide, silicon nitride, or silicon carbide nitride. Other suitable dielectric capping materials are within the contemplated scope of disclosure. The thickness of the optional dielectric capping layer 22, if present, may be in a range from 2 nm to 100 nm, although lesser and greater thicknesses may also be used. The dielectric isolation layer 24 comprises a dielectric material such as undoped silicate glass or a doped silicate glass. The dielectric isolation layer 24 may comprise a planar top surface, i.e., a top surface located entirely within a horizontal plane. The thickness of the dielectric isolation layer 24 may be in a range from 100 nm to 300 nm, such as from 120 nm to 200 nm, although lesser and greater thicknesses may also be used.

Figure 2A:
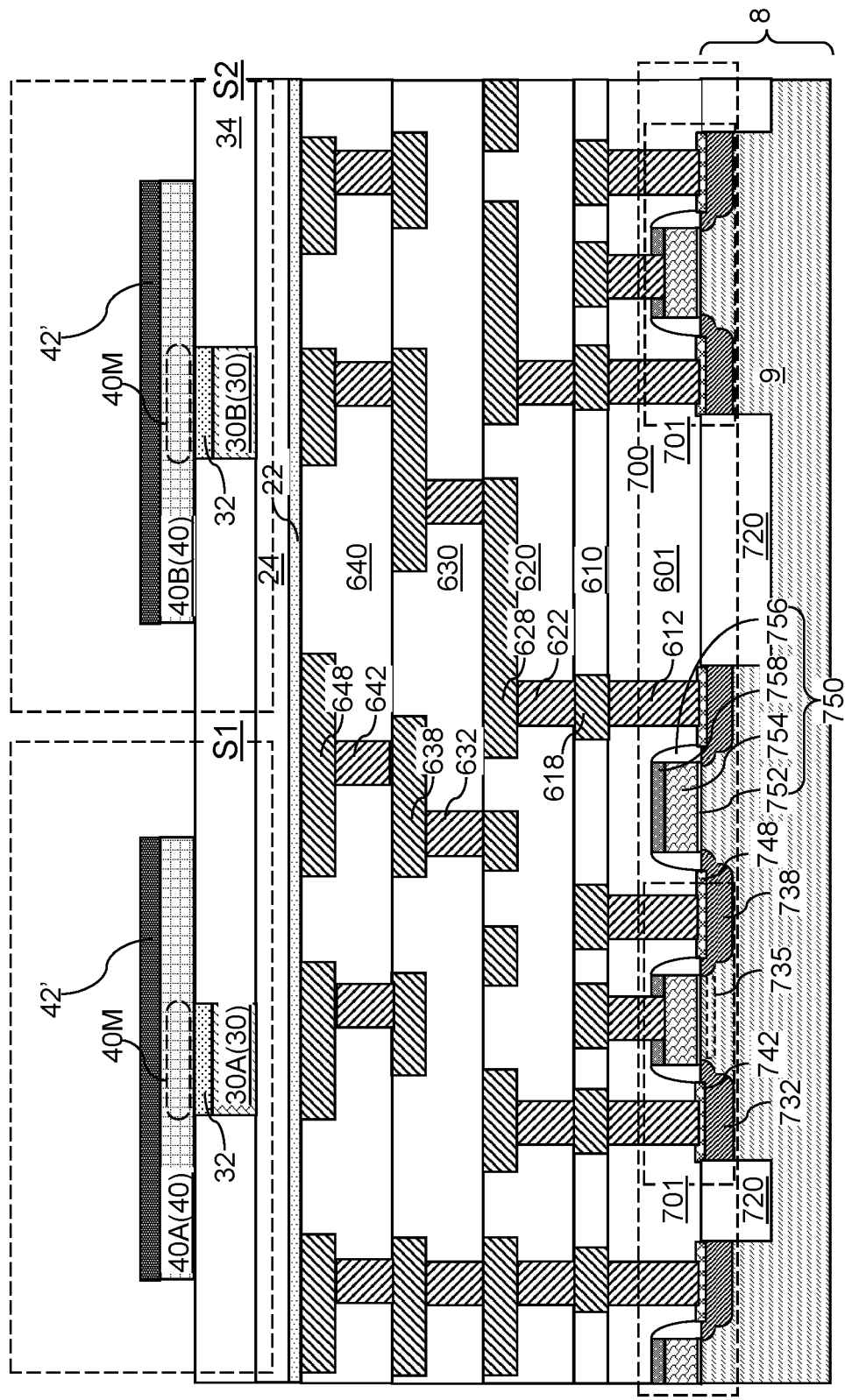
FIGS. 2A and 2B are vertical cross-sectional views of a first region and an optional second region, respectively, of the structure after formation of phase change memory lines according to an embodiment of the present disclosure.
Figure 2B:
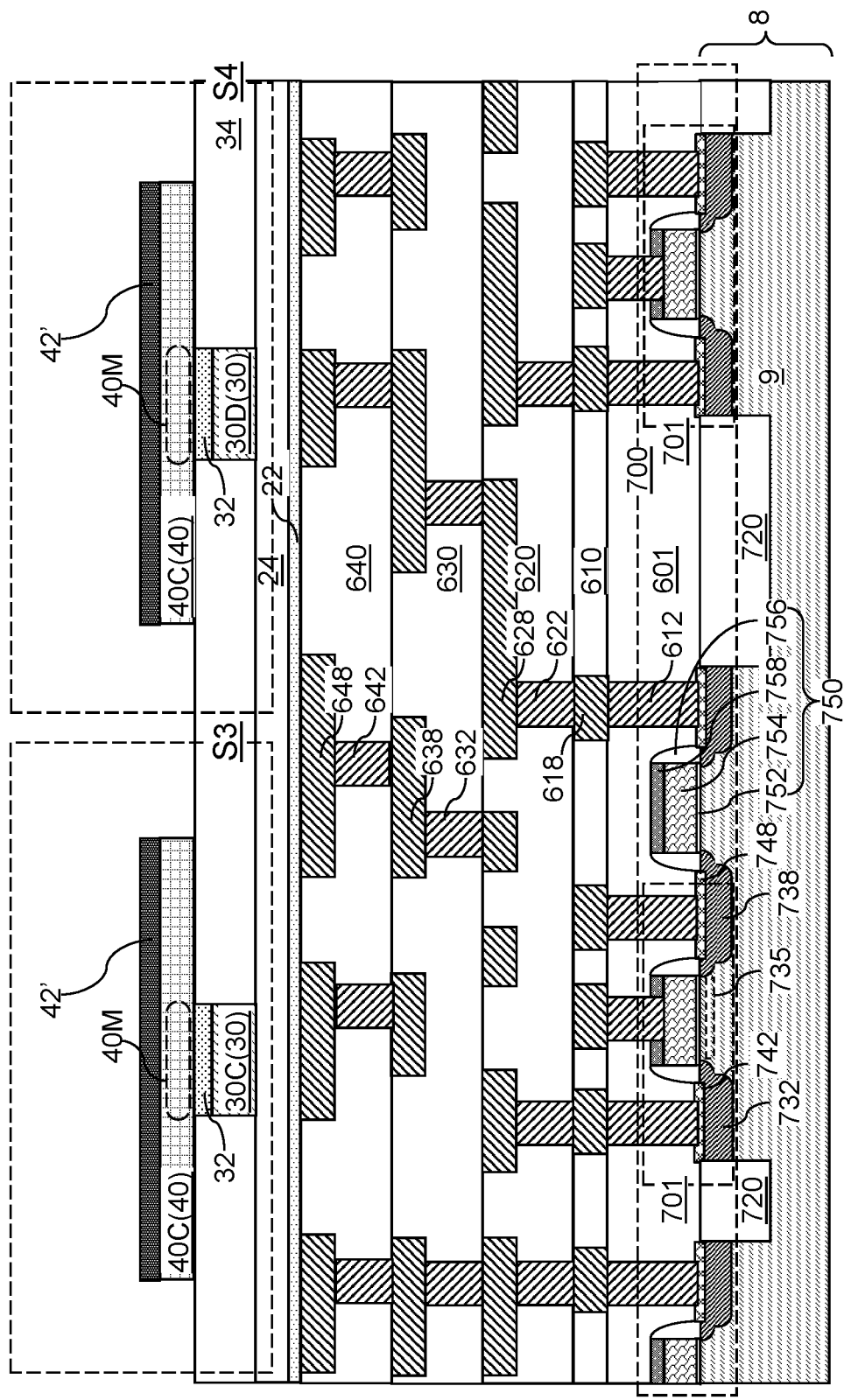

FIGS. 2A and 2B are vertical cross-sectional views of a first region and an optional second region, respectively, of the structure after formation of phase change memory lines according to an embodiment of the present disclosure. The second region is optional, and thus, may, or may not, be used for the purpose of the present disclosure.

In one embodiment, a heater material layer, and a continuous thermally-conductive and electrically-insulating layer may be formed. The heater material layer may include a metallic material having a lower electrical conductivity than copper or aluminum. In one embodiment, the heater material layer may comprise a refractory elemental metal such as tungsten, rhenium, tantalum, molybdenum, or niobium, or may comprises a conductive metallic nitride material such as tungsten nitride, titanium nitride, or tantalum nitride. In another embodiment, the heater material layer comprises an aluminum-nitrogen alloy such as an aluminum nitride material or a mixture of aluminum and aluminum nitride material. In some embodiments, the heater material layer may be formed by co-sputtering of an aluminum target and an aluminum nitride target. In one embodiment, nanoscale grains of aluminum and aluminum nitride may be mixed within the heater material layer. In some other embodiments, the heater material layer may be formed by performing a reactive sputtering process in which aluminum is sputtered in a nitridating ambient environment. In this embodiment, the atomic percentage of nitrogen in a homogeneous aluminum nitride material within the heater material layer may be in a range from 0.001% to 50.000%. In one embodiment, the atomic percentage of nitrogen may be optimized to provide optimal electrical resistivity within the heater material layer. In one embodiment, the atomic percentage of nitrogen may have a vertical gradient such that the atomic percentage of nitrogen decrease with a vertical distance from the substrate 8, and heat generation is greater at an upper portion of a heater line to be patterned from the heater material layer than at a lower portion of the heater line. This type of atomic concentration gradient is more effective in providing heat to a phase change material line to be subsequently formed. The thickness of the heater material layer may be in a range from 50 nm to 300 nm, such as from 100 nm to 200 nm, although lesser and greater thicknesses may also be used.

The continuous thermally-conductive and electrically-insulating layer may be formed on, and over, a top surface of the heater material layer. In one embodiment, the continuous thermally-conductive and electrically-insulating layer may comprise an aluminum nitride layer that extends continuously as a blanket material layer. The thickness of the continuous thermally-conductive and electrically-insulating layer may be in a range from 10 nm to 100 nm, such as from 20 nm to 60 nm, although lesser and greater thicknesses may also be used.

A photoresist layer (not shown) may be applied over the continuous thermally-conductive and electrically-insulating layer, and may be lithographically patterned to form a discrete photoresist material portion having an elongated horizontal cross-sectional shape such as a rectangular shape. In one embodiment, the elongated shape may be a rectangular shape having a uniform width along a horizontal direction that is perpendicular to a lengthwise direction.

The pattern in the patterned photoresist layer may be transferred through the continuous thermally-conductive and electrically-insulating layer and through the heater material layer by performing an etch process. In one embodiment, an anisotropic etch process, such as a reactive ion etch process, may be performed to etch unmasked portions of the continuous thermally-conductive and electrically-insulating layer and the heater material layer. In one embodiment, the anisotropic etch process may be selective to the material of the dielectric isolation layer 24. Each remaining portion of the heater material layer comprises a heater line 30, and each remaining portion of the continuous thermally-conductive and electrically-insulating layer comprises a thermally-conductive and electrically-insulating layer 32. In one embodiment, each heater line 30 and a respective overlying thermally-conductive and electrically-insulating layer 32 may have the same area. The discrete photoresist material portion may be subsequently removed, for example, by ashing. The thermally-conductive and electrically-insulating layer 32 contacts the top surface of the heater line 30.

According to an aspect of the present disclosure, a plurality of phase change material (PCM) switches (S1, S2, S3, S4) may be formed over the substrate 8 to provide a PCM switch circuit. For example, the PCM switches (S1, S2, S3, S4) may comprise a first PCM switch S1, a second PCM switch S2, a third PCM switch S3, and a fourth PCM switch S4. In this embodiment, the heater lines 30 may comprise a first heater line 30A used to form the first PCM switch S1, a second heater line 30B used to form the second PCM switch S2, a third heater line 30C used to form the third PCM switch S3, and a fourth heater line 30D used to form the fourth PCM switch S4.

A dielectric matrix layer 34 may be formed by deposition and planarization of a dielectric material. In one embodiment, the dielectric matrix layer 34 comprises undoped silicate glass or a doped silicate glass, and may be formed, for example, by chemical vapor deposition or spin coating. Portions of the dielectric material that are deposited above the horizontal plane including the top surface of the thermally-conductive and electrically-insulating layer 32 may be removed by a planarization process, which may use a recess etch process and/or a chemical mechanical polishing (CMP) process. The dielectric matrix layer 34 laterally surrounds the heater line 30 and the thermally-conductive and electrically-insulating layer 32. In one embodiment, the top surface of the dielectric matrix layer 34 may be coplanar with the top surface of the thermally-conductive and electrically-insulating layer 32, i.e., may be located within the horizontal plane including a top surface of the thermally-conductive and electrically-insulating layer 32.

A phase change material layer and an optional conductive barrier material layer may be formed over the dielectric matrix layer 34 and the thermally-conductive and electrically-insulating layer 32. As used herein, a "phase change material" refers to a material having at least two different phases providing different resistivity. A phase change material (PCM) may be used to store information as a resistivity state of a material that may be in different resistivity states corresponding to different phases of the material. The different phases may include an amorphous state having high resistivity and a crystalline state having low resistivity (i.e., a lower resistivity than in the amorphous state). The transition between the amorphous state and the crystalline state may be induced by controlling the rate of cooling after application of an electrical pulse that renders the phase change material amorphous in a first part of a programming process. The second part of the programming process includes control of the cooling rate of the phase change material. In embodiments in which rapid quenching occurs, the phase change material may cool into an amorphous high resistivity state. In embodiments in which slow cooling occurs, the phase change material may cool into a crystalline low resistivity state.

Exemplary phase change materials include, but are not limited to, germanium antimony telluride (GST) compounds such as $Ge_2Sb_2Te_5$ or $GeSb_2Te_4$, germanium antimony compounds, indium germanium telluride compounds, aluminum selenium telluride compounds, indium selenium telluride compounds, and aluminum indium selenium telluride compounds. The phase change material may be doped (e.g., nitrogen doped GST) or undoped to enhance resistance-switching characteristics. The thickness of the phase change material layer (which is also referred to as a PCM material layer) may be in a range from 30 nm to 600 nm, such as from 60 nm to 300 nm, although lesser and greater thicknesses may also be used.

The conductive barrier material layer may include a conductive material that may function as an effective barrier against diffusion of the phase change material in the PCM material layer. For example, the conductive barrier material layer may comprise a carbon-based material (such as graphene or carbon nanotubes), a metallic diffusion barrier material (such as tungsten nitride, titanium nitride, tantalum nitride, or molybdenum nitride), or any other suitable conductive barrier material that may effectively suppress out-diffusion of the phase change material in the PCM material layer. The thickness of the conductive barrier material layer may be in a range from 5 nm to 100 nm, such as from 10 nm to 50 nm, although lesser and greater thicknesses may also be used.

A photoresist layer (not shown) may be applied over the conductive barrier material layer, and may be lithographically patterned to provide elongated photoresist material portions that straddle a respective thermally-conductive and electrically-insulating layer 32. Unmasked portions of the conductive barrier material layer and unmasked portions of the PCM material layer may be etched by performing an anisotropic etch process that uses the patterned photoresist material portion as an etch mask. Each remaining portion of the conductive barrier material layer comprises an in-process conductive barrier plate 42'. Each remaining portion of the PCM material layer may include a phase change material line 40, which is also referred to as a PCM line 40. Each stack of a PCM line 40 and an in-process conductive barrier plate 42' straddles a respective combination of a heater line 30 and a thermally-conductive and electrically-insulating layer 32. The photoresist layer may be subsequently removed, for example, by ashing. As used herein, an in-process structure refers to a structure that may be subsequently modified.

Combinations including a respective heater line 30, a respective thermally-conductive and electrically-insulating layer 32, a respective phase change material (PCM) line 40, and a respective in-process conductive barrier plate 42' may be formed over the dielectric isolation layer 24. The bottom surface of each heater line 30 may be formed directly on a planar top surface of the dielectric isolation layer 24. Each phase change material (PCM) line 40 comprises a middle portion 40M that overlies a respective heater line 30, a first end portion adjoined to a first side of the middle portion 40M and contacting a first surface segment of the dielectric matrix layer 34, and a second end portion adjoined to a second side of the middle portion 40M and contacting a second surface segment of the dielectric matrix layer 34. The thermally-conductive and electrically-insulating layer 32 may be provided between a respective heater line 30 and a respective PCM line 40. Each thermally-conductive and electrically-insulating layer 32 may contact a top surface of the heater line 30. A bottom surface of the middle portion 40M of a PCM line 40 contacts a segment of a top surface of a respective underlying thermally-conductive and electrically-insulating layer 32.

According to an aspect of the present disclosure, a plurality of phase change material (PCM) switches (S1, S2, S3, S4) may be formed over the substrate 8 to provide a PCM switch circuit. For example, the PCM switches (S1, S2, S3, S4) may comprise a first PCM switch S1, a second PCM switch S2, a third PCM switch S3, and a fourth PCM switch S4. In this embodiment, the PCM lines 40 may comprise a first PCM line 40A that overlies the first heater line 30A and used to form the first PCM switch S1, a second PCM line 40B that overlies the second heater line 30B and used to form the second PCM switch S2, a third PCM line 40C that overlies the third heater line 30C and used to form the third PCM switch S3, and a fourth PCM line 40D that overlies the fourth heater line 30D and used to form the fourth PCM switch S4. In one embodiment, the first PCM switch S1 and/or the third PCM switch S3 may be used as at least one main signal transmission switch, and the second PCM switch S2 and the fourth PCM switch S4 may be used as at least one bypass switch. In this embodiment, the first PCM line 40A and the third PCM line 40C may have a greater width than, and may provide a lower on-impedance than, the second PCM line 40B and the fourth PCM line 40D. In one embodiment, the ratio of the widths of the first PCM line 40A and the third PCM line 40C to the widths of the second PCM line 40B and the fourth PCM line 40D may be in a range from 1.5 to 10, such as from 2 to 5, although any number greater than 1 may be used.

Figure 3A:
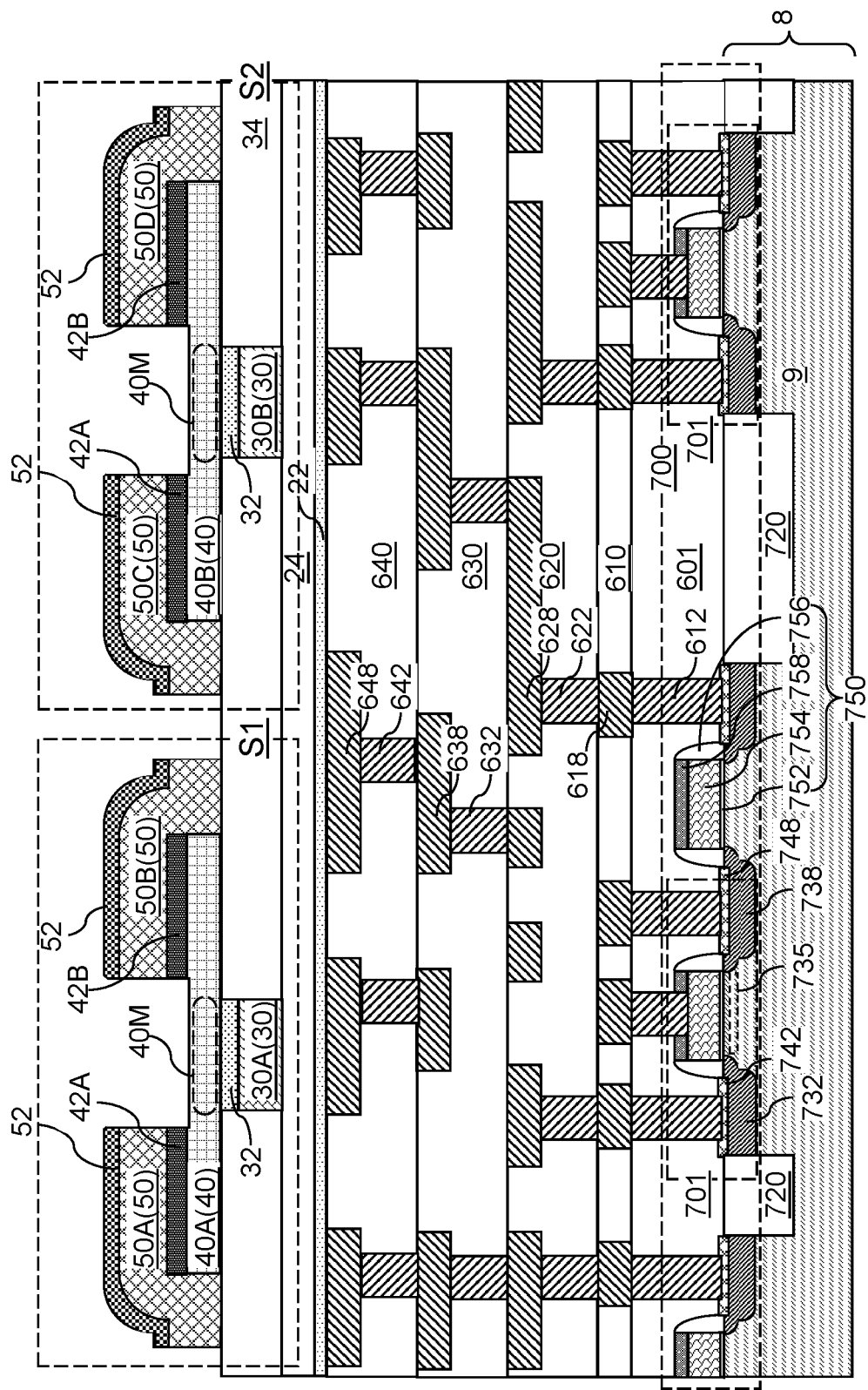
FIGS. 3A and 3B are vertical cross-sectional views of the first region and the second region, respectively, of the structure after formation of contact electrodes according to an embodiment of the present disclosure.
Figure 3B:
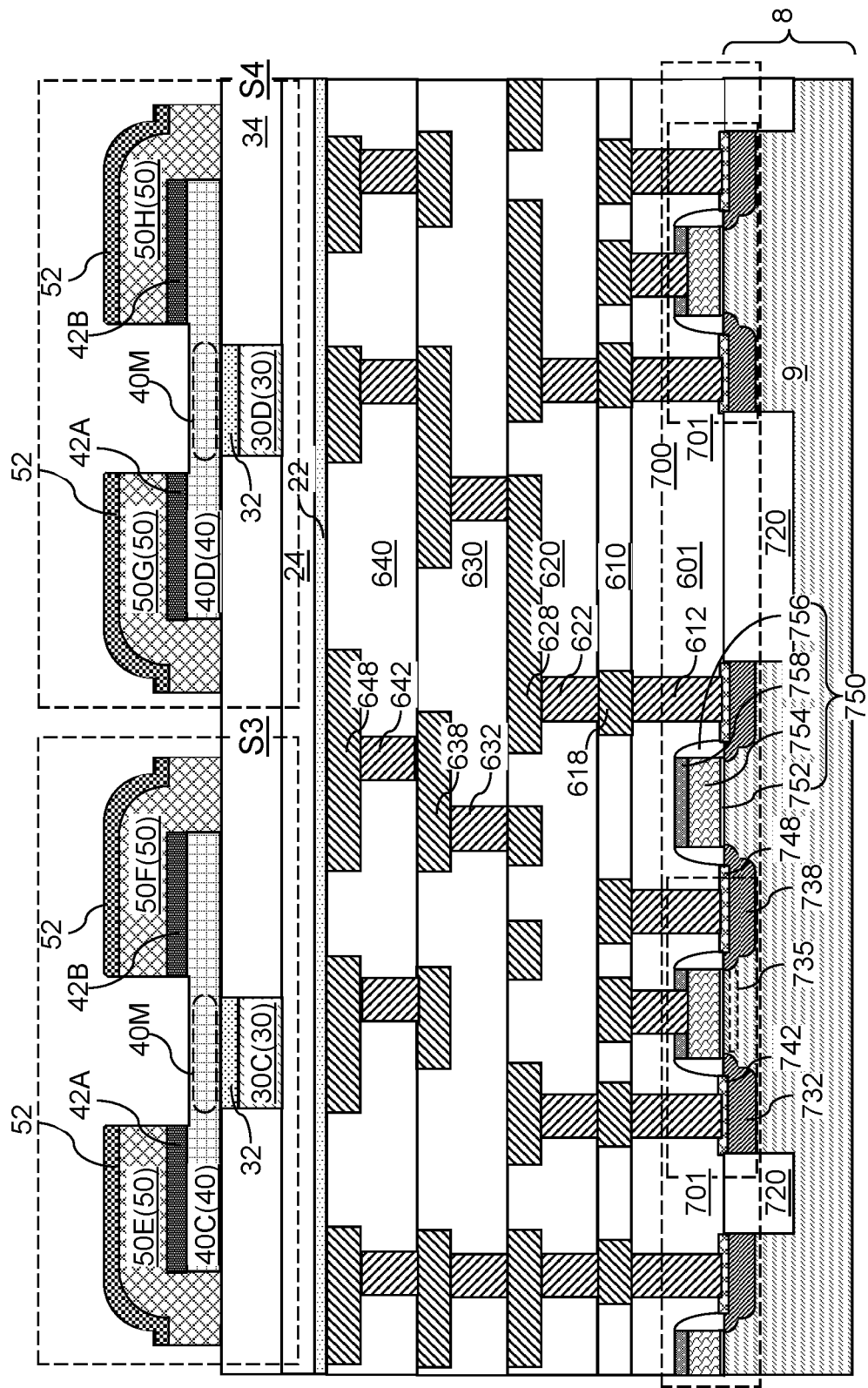

FIGS. 3A and 3B are vertical cross-sectional views of the first region and the second region, respectively, of the structure after formation of contact electrodes according to an embodiment of the present disclosure.

A contact electrode material layer and a contact electrode-capping dielectric layer may be deposited over the in-process conductive barrier plate 42' and the thermally-conductive and electrically-insulating layer 32. The contact electrode material layer comprises a metallic material such as a refractory metal (such as tungsten, rhenium, tantalum, niobium, or molybdenum), and may have a thickness in a range from 50 nm to 500 nm, such as from 100 nm to 300 nm, although lesser and greater thicknesses may also be used. The contact electrode-capping dielectric layer may include a dielectric diffusion barrier material such as silicon nitride, silicon carbide, or silicon carbide nitride. Other suitable dielectric diffusion barrier materials are within the contemplated scope of disclosure. The thickness of the contact electrode-capping dielectric layer may be in a range from 10 nm to 100 nm, such as from 20 nm to 60 nm, although lesser and greater thicknesses may also be used. The contact electrode material layer may be formed directly on an area of the planar top surface of the dielectric matrix layer 34.

A photoresist layer (not shown) may be applied over the contact electrode-capping dielectric layer, and may be lithographically patterned to form pairs of discrete photoresist material portions that overlie a respective end portion of each PCM line 40. In one embodiment, the photoresist layer may be patterned such that each pair of patterned discrete photoresist material portion is located on opposite sides of a respective heater line 30 and covers a pair of end portions of a respective PCM line 40.

An anisotropic etch process may be performed to remove portions of the contact electrode-capping dielectric layer, the contact electrode material layer, and the in-process conductive barrier plate 42' that are not masked by the pairs of discrete photoresist material portions. Patterned portions of the contact electrode material layer comprise contact electrodes 50.

According to an aspect of the present disclosure, a plurality of phase change material (PCM) switches (S1, S2, S3, S4) may be formed over the substrate 8 to provide a PCM switch circuit. For example, the PCM switches (S1, S2, S3, S4) may comprise a first PCM switch S1, a second PCM switch S2, a third PCM switch S3, and a fourth PCM switch S4. In this embodiment, the contact electrodes 50 may comprise a first contact electrode 50A located on a first end of the first PCM line 40A, a second contact electrode 50B located on a second end of the first PCM line 40A, a third contact electrode 50C located on a first end of the second PCM line 40B, a fourth contact electrode 50D located on a second end of the second PCM line 40B, a fifth contact electrode 50E located on a first end of the third PCM line 40C, a sixth contact electrode 50F located on a second end of the third PCM line 40C, a seventh contact electrode 50G located on a first end of the fourth PCM line 40D, and an eighth contact electrode 50H located on a second end of the fourth PCM line 40D. In one embodiment, each contact electrode 50 may contact at least one sidewall of an end portion of a respective PCM line 40.

Patterned portions of the contact electrode-capping dielectric material layer comprise contact electrode-capping dielectric plates 52. Each contact electrode-capping dielectric material layer 52 may contact the entirety of a top surface of a respective contact electrode 50. A horizontally-extending portion of the in-process conducive barrier plate 42' may be removed from above the area of the heater line 30. Patterned remaining portions of the in-process conductive barrier plate 42' comprise first conductive barrier plates 42A contacting a first area of a top surface of a respective underlying PCM line 40, and second conductive barrier plates 42B contacting a second area of the top surface of the respective underlying PCM line 40. Each contact electrode 50 may contact one of the first conductive barrier plates 42A and the second conductive barrier plates 42B.

In one embodiment, each first conductive barrier plate 42A contacts a first end portion of a respective underlying PCM line 40. In one embodiment, each second conductive barrier plate 42B contacts a second end portion of a respective underlying PCM line 40.

Figures 4B, 4C:
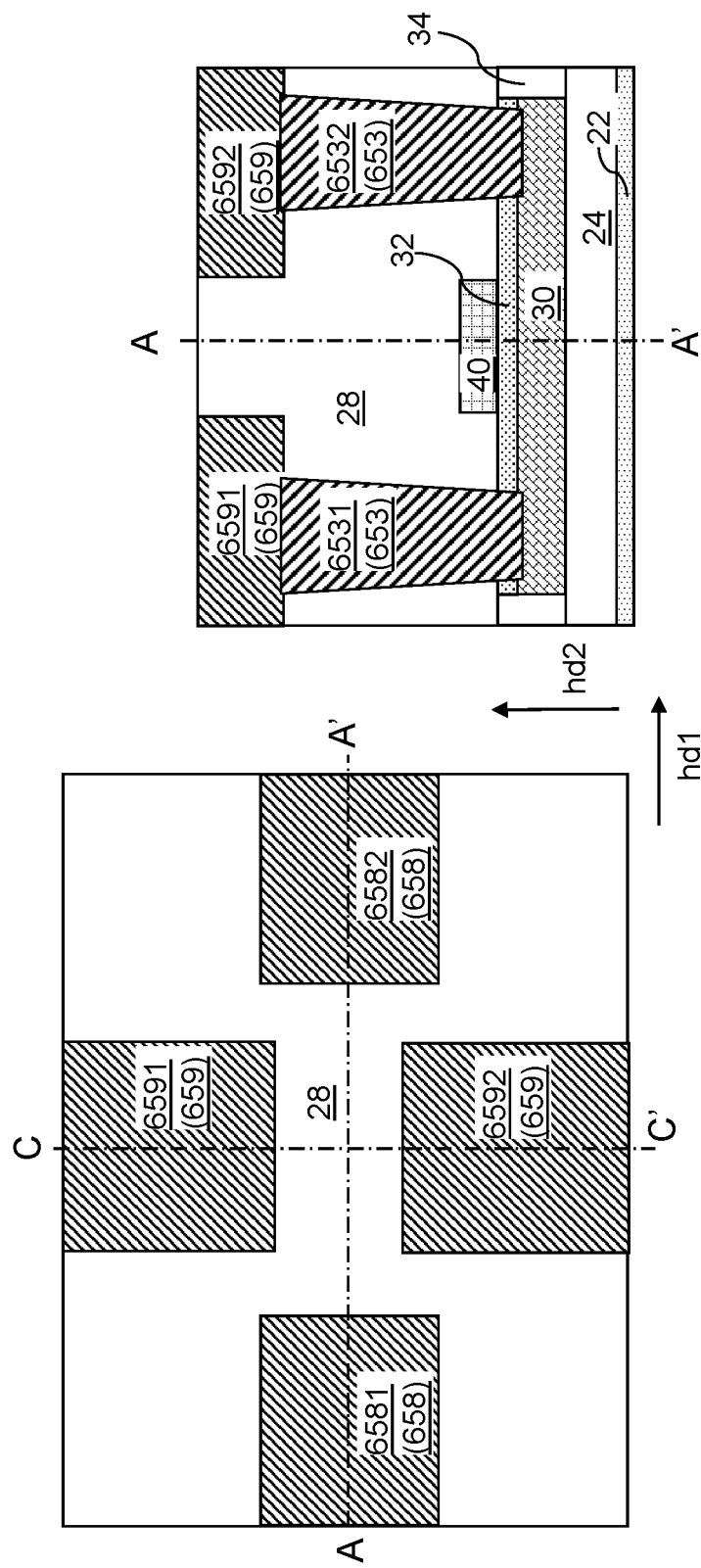
Figure 4D:
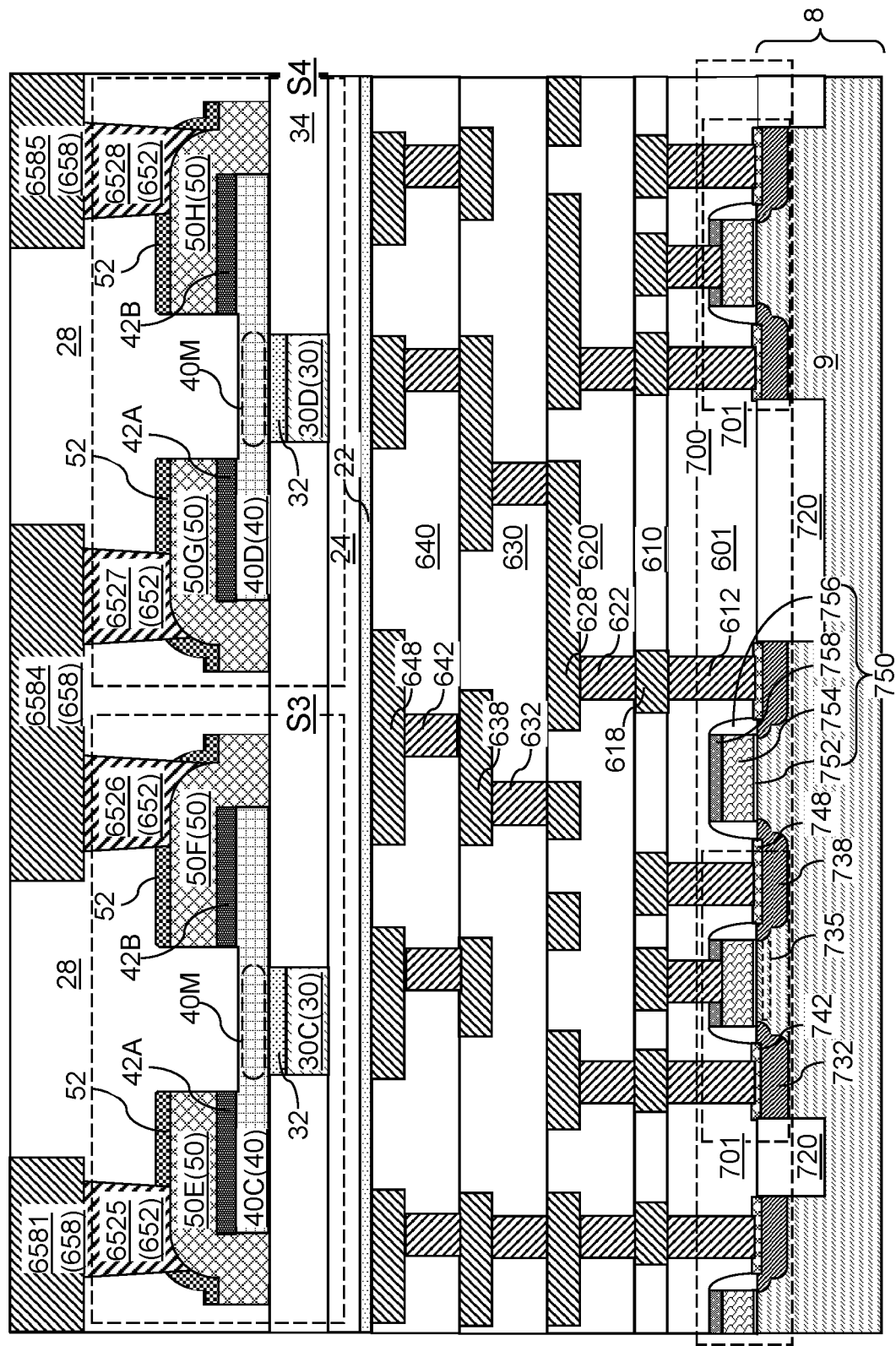

FIGS. 4A-4D are various views of the exemplary structure after formation of phase change memory switches and interconnect structures according to an embodiment of the present disclosure. FIG. 4A is a vertical cross-sectional view of the first region of the exemplary structure. FIG. 4B is a top-down view of the first region of the exemplary structure. The vertical plane A-A' is the plane of the vertical cross-section of FIG. 4A. FIG. 4C is a vertical cross-sectional view along the vertical plane C-C' of FIG. 4B. FIG. 4D is a vertical cross-sectional view of the second region of the exemplary structure.

A dielectric material layer may be deposited over the contact electrodes 50 and the PCM lines 40. The dielectric material layer is herein referred to as a switch-level dielectric material layer 28. Additional metal interconnect structures (652, 653, 658, 659) may be formed in the switch-level dielectric material layer 28. The additional metal interconnect structures (652, 653, 658, 659) are herein referred to as switch-level metal interconnect structures (652, 653, 658, 659), and may comprise switch-level metal line structures (658, 659) and switch-level metal via structures (652, 653).

The switch-level metal via structures (652, 653) may comprise electrode contact via structures 652 contacting a respective one of the contact electrodes 50. According to an aspect of the present disclosure, a plurality of phase change material (PCM) switches (S1, S2, S3, S4) may be formed over the substrate 8 to provide a PCM switch circuit. For example, the PCM switches (S1, S2, S3, S4) may comprise a first PCM switch S1, a second PCM switch S2, a third PCM switch S3, and a fourth PCM switch S4. In this embodiment, the electrode contact via structures 652 may comprise a first electrode contact via structure 6521 contacting a top surface of the first contact electrode 50A, a second electrode contact via structure 6522 contacting a top surface of the second contact electrode 50B, a third electrode contact via structure 6523 contacting a top surface of the third contact electrode 50C, a fourth electrode contact via structure 6524 contacting a top surface of the fourth contact electrode 50D, a fifth electrode contact via structure 6525 contacting a top surface of the fifth contact electrode 50E, a sixth electrode contact via structure 6526 contacting a top surface of a sixth contact electrode 50F, a seventh electrode contact via structure 6527 contacting a top surface of the seventh contact electrode 50G, and an eighth electrode contact via structure 6528 contacting a top surface of the eighth contact electrode 50H.

Further, the switch-level metal via structures (652, 653) may comprise heater contact via structures 653 contacting an end portion of a respective heater line 30. In one embodiment, each heater liner 30 may be contacted by a respective pair of a first heater contact via structure 6531 and a second heater contact via structure 6532.

According to an aspect of the present disclosure, the switch-level metal line structures (658, 659) may comprise a first electrode-connection metal line 6581 contacting, and/or electrically connected to, the first electrode contact via structure 6521 and the fifth electrode contact via structure 6525 (in embodiments in which the third PCM switch S3 is used); a second electrode-connection metal line 6582 contacting, and/or electrically connected to, the second electrode contact via structure 6522 and the third electrode contact via structure 6523; a third electrode-connection metal line 6583 contacting, and/or electrically connected to, the fourth electrode contact via structure 6524; a fourth electrode-connection metal line 6584 contacting, and/or electrically connected to, the sixth electrode contact via structure 6526 and the seventh electrode contact via structure 6527; and an optional fifth electrode-connection metal line 6585 contacting, and/or electrically connected to, the eighth electrode contact via structure 6528. In embodiments in which the fifth electrode-connection metal line 6585 is omitted, the first electrode-connection metal line 6581 may contact the eighth electrode contact via structure 6528. The first electrode-connection metal line 6581 and the fifth electrode-connection metal line 6585 may be electrically grounded, e.g., may be connected to the semiconductor material layer 9 in the substrate 8 through an electrically conductive path comprising additional switch-level metal interconnect structures (652, 653, 658, 659) and a subset of the underlying metal interconnect structures (612, 618, 622, 628, 632, 638, 642, 648).

The switch-level metal line structures (658, 659) may further comprise heater-connection metal lines 659. For example, the heater-connection metal lines 659 may comprise first heater-connection metal lines 6591 contacting a top surface of a respective first heater contact via structure 6531, and second heater-connection metal lines 6592 contacting a top surface of a respective second heater contact via structure 6532. Generally, the heater-connection metal lines 659 may be connected to a respective output port of a programming circuit located within the CMOS circuitry on the substrate through electrically conductive paths comprising a subset of the switch-level metal interconnect structures (652, 653, 658, 659) and a subset of the underlying metal interconnect structures (612, 618, 622, 628, 632, 638, 642, 648).

Figure 5A:
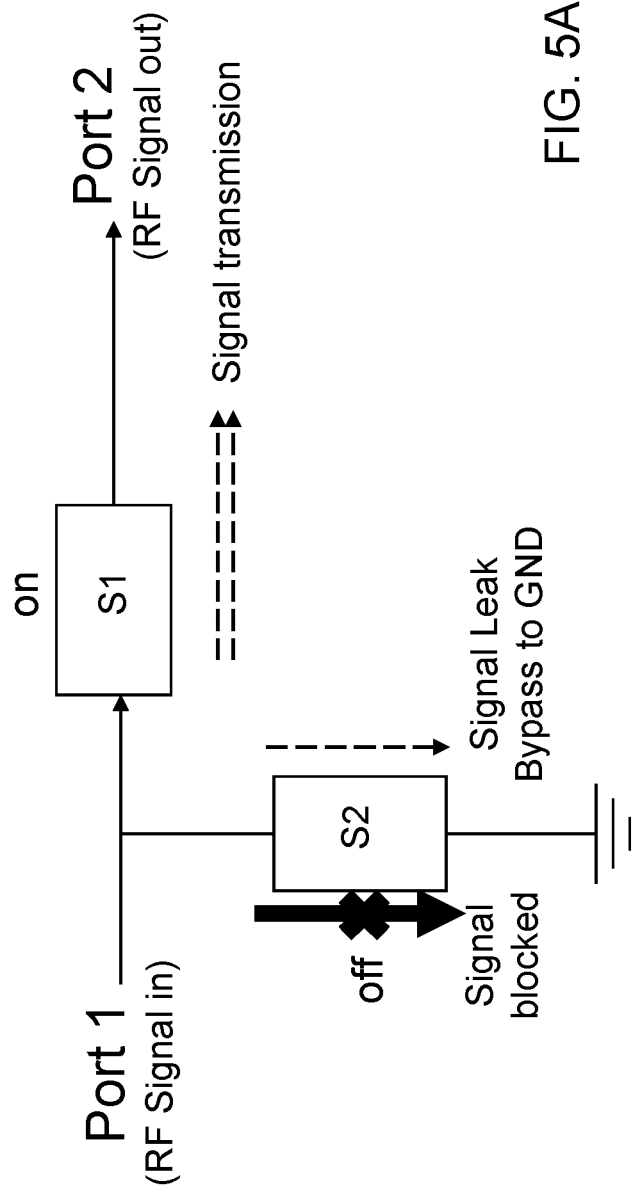
FIG. 5A is a circuit diagram of a first PCM switch circuit while the main signal switch is turned on according to an embodiment of the present disclosure.
Figure 5B:
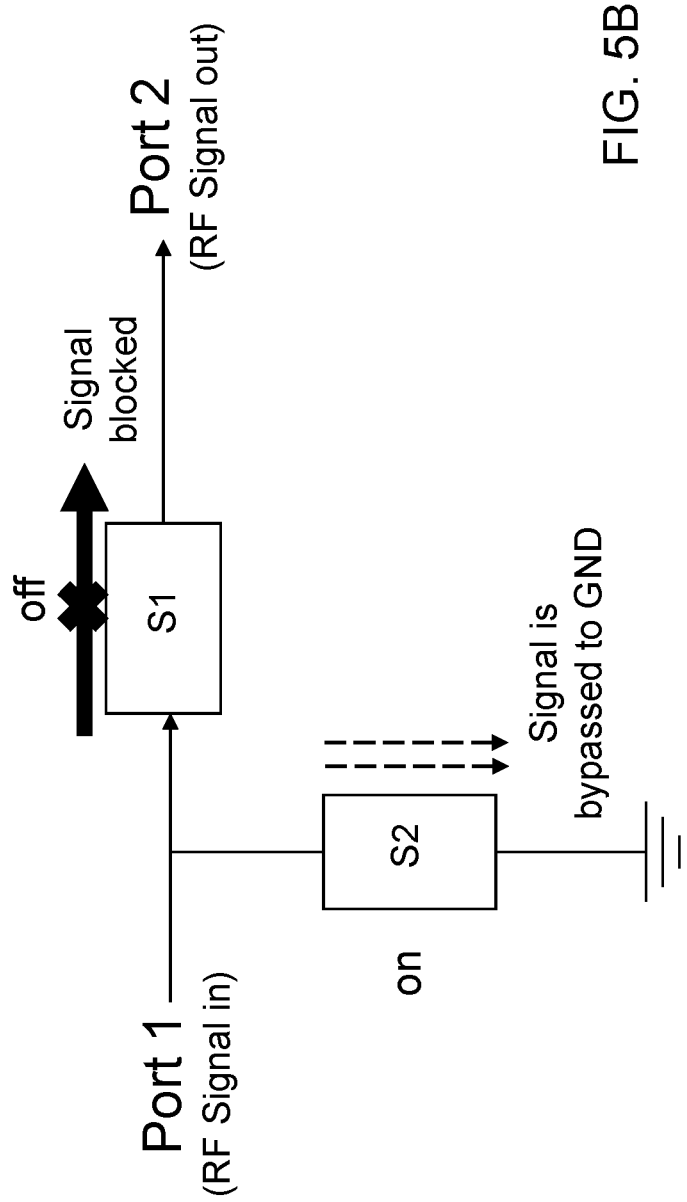
FIG. 5B is a circuit diagram of the first PCM switch circuit while the main signal switch is turned off according to an embodiment of the present disclosure.

Referring to FIGS. 5A and 5B, circuit diagrams are illustrated for a first PCM switch circuit according to an embodiment of the present disclosure. FIG. 5A illustrates a configuration in which the main signal switch which comprises a first PCM switch S1, is turned on, and FIG. 5B illustrates a configuration in which the main signal switch is turned off. According to an aspect of the present disclosure, the first exemplary PCM switch circuit illustrated in FIGS. 5A and 5B comprises a first series connection of a first phase change memory (PCM) switch S1 and a second PCM switch S2. The first PCM switch S1 and the second PCM switch S2 may be implemented as illustrated in FIGS. 4A-4C.

Referring collectively to FIGS. 4A-4C, 5A, and 5B, the node of a first contact electrode 50A of the first PCM switch S1 may be used as an RF signal output port, and the node of the second contact electrode 50B of the first PCM switch S1 may be used as an RF signal input port. The node of the third contact electrode 50C of the second PCM switch S2 is electrically connected to the second contact electrode 50B of the first PCM switch S1, and the node of the fourth contact electrode 50D of the second PCM switch S2 is connected to electrical ground. According to an aspect of the present disclosure, the first PCM switch S1 and the second PCM switch S2 are in complementary states. In other words, if the first PCM switch S1 is on, the second PCM switch S2 is off, and vice versa.

Referring to FIG. 5A, the first exemplary PCM switch circuit is shown in an "on" state in which the input signal applied to the input port is transmitted to the output port. The signal path between the input port and the electrical ground is blocked. Any leakage signal through the second PCM switch S2 is routed to electrical ground, and thus, the signal integrity of the transmitted signal is not degraded.

Referring to FIG. 5B, the first exemplary PCM switch circuit is in an "off" state in which the input signal is routed through the second PCM switch S2, and the first PCM switch S1 is turned off. Thus, the signal path between the input port and the output port is blocked. By providing a low impedance signal path to electrical ground through the second PCM switch S2, the magnitude of the leakage signal through the first PCM switch S1 is reduced. Thus, the first exemplary PCM switch circuit comprising the plurality of PCM switches may provide a reduced noise level compared to a PCM switch circuit consisting of a single PCM switch.

Figure 6:
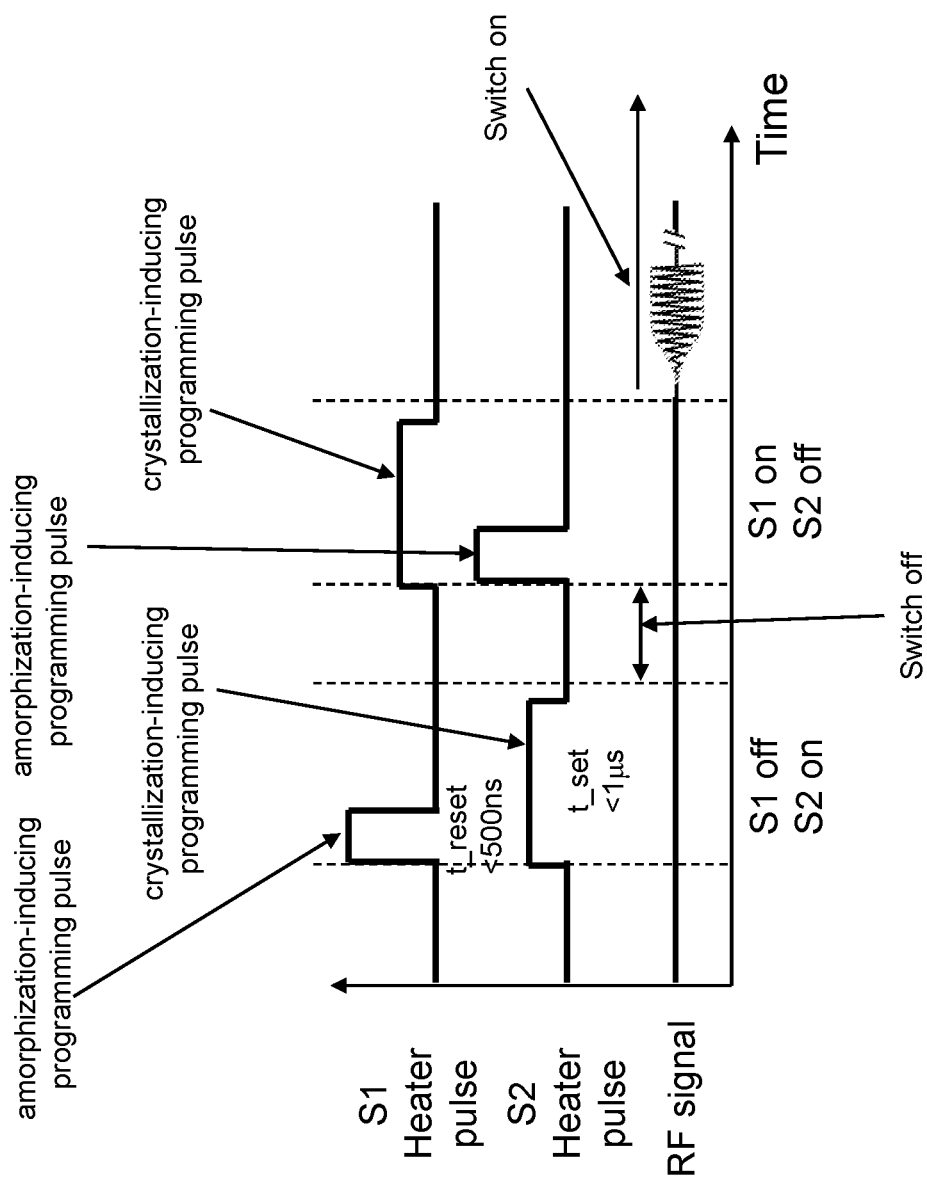
FIG. 6 is a timing diagram for the pulse patterns that are applied to the heaters of the two signal switches in the first PCM switch circuit.

Referring to FIG. 6, a timing diagram is illustrated for the pulse patterns that may be applied to the heater lines 30 of the two signal switches in the first exemplary PCM switch circuit. According to an aspect of the present disclosure, the first exemplary PCM switch circuit may be configured so that complementary types of programming pulses are applied to the first heater line within the first PCM switch S1 and the second heater line within the second PCM switch S2.

In order to turn off the first exemplary PCM switch circuit, an amorphization-inducing programming pulse (also referred to as a reset pulse) may be applied to the first heater line within the first PCM switch S1, and a crystallization-inducing programming pulse (also referred to as a set pulse) may be applied to the second heater line within the second PCM switch S2. An amorphization-inducing programming pulse through a heater line induces a high resistance state (i.e., an amorphous state) within an adjacent PCM line, and programs the PCM switch including the adjacent PCM line into an off state. A crystallization-inducing programming pulse through a heater line induces a low resistance state (i.e., a crystallized state) within an adjacent PCM line, and programs the PCM switch including the adjacent PCM line into an on state. In order to turn on the first exemplary PCM switch circuit, a crystallization-inducing programming pulse may be applied to the first heater line within the first PCM switch S1, and an amorphization-inducing programming pulse may be applied to the second heater line within the second PCM switch S2.

Generally, clocks are not necessary for application of the complementary programming pulses. The transistors 700 within CMOS circuit 700 may be coupled to one another such that two type of programming pulses are generated simultaneously. According to an aspect of the present disclosure, sequential application of an amorphization-inducing programming pulse and a crystallization-inducing programming pulse may enhance isolation performance by increasing the impedance of the PCM switches in their respective off state. Generally, the duration of the amorphization-inducing programming pulse (i.e., a reset pulse) may be less than 500 ns, such as less than 100 ns, and the duration of the crystallization-inducing programming pulse (i.e., a set pulse) may be less than 1 microsecond, such as less than 800 ns.

Figure 7:
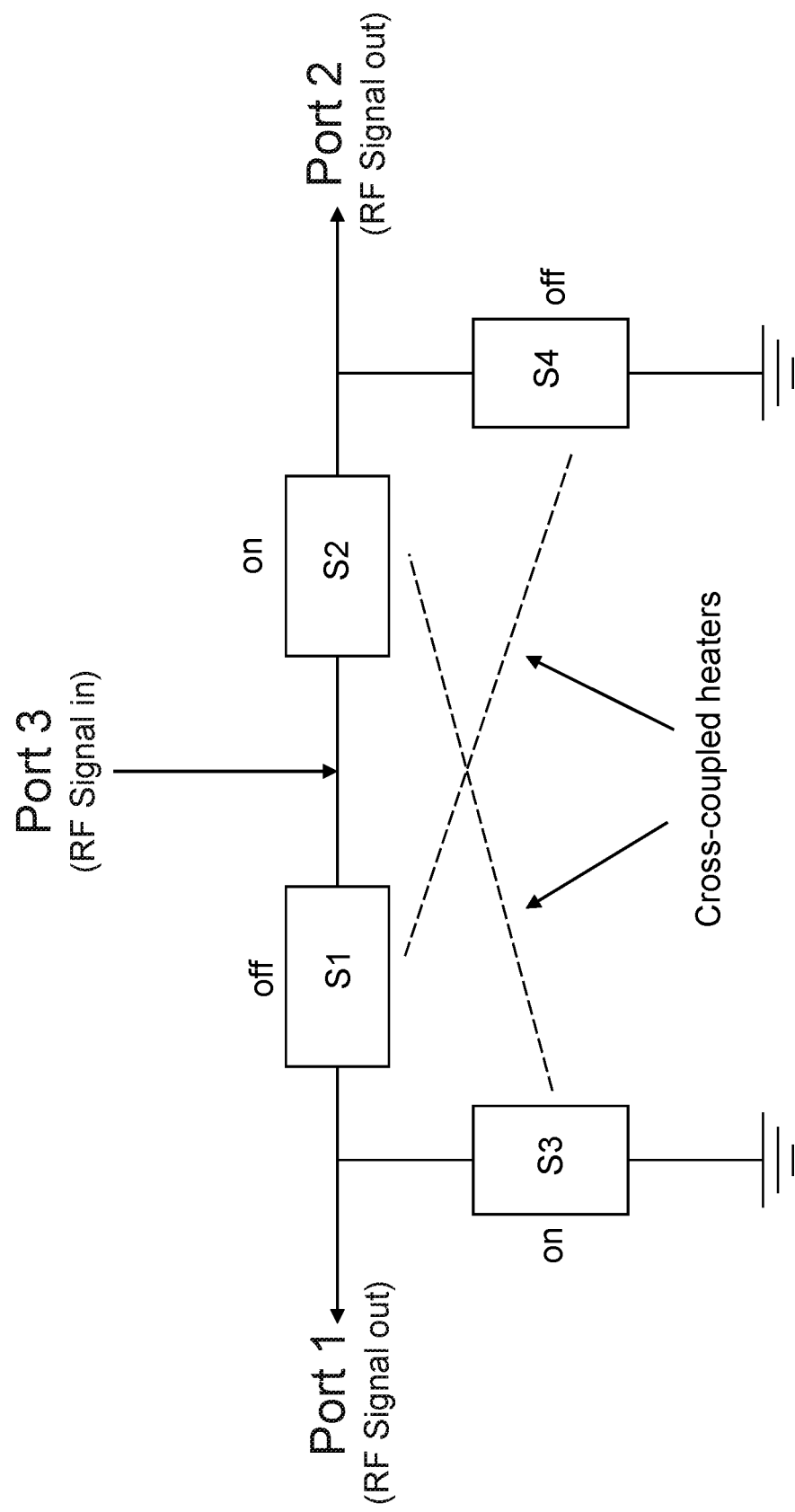
FIG. 7 is a circuit diagram of a second PCM switch circuit in a first operational mode according to an embodiment of the present disclosure.
Figure 8:
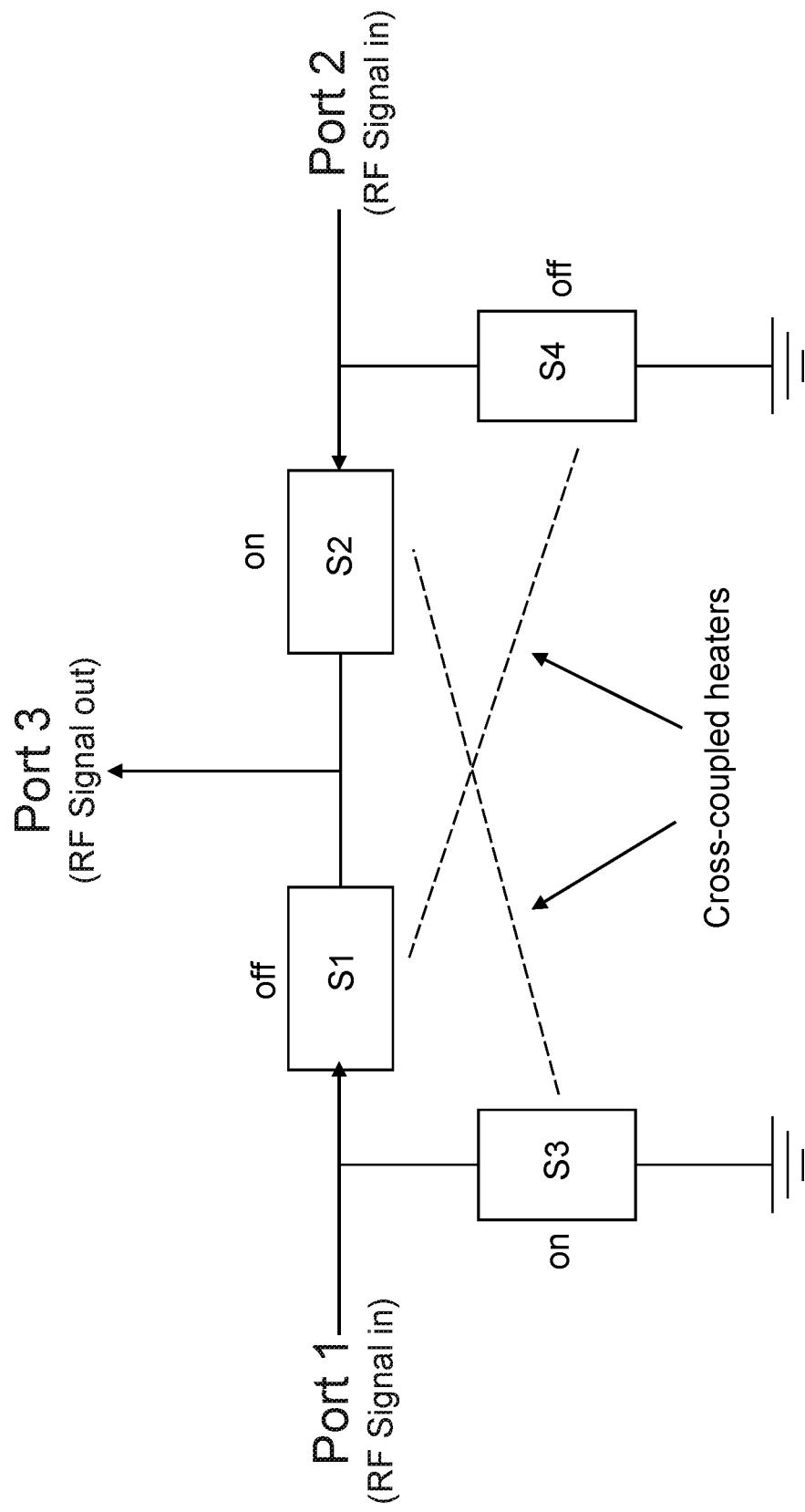
FIG. 8 is a circuit diagram of a second PCM switch circuit in a second operational mode according to an embodiment of the present disclosure.

Referring to FIGS. 7 and 8, circuit diagrams are illustrated for a second exemplary PCM switch circuit according to an embodiment of the present disclosure. According to an aspect of the present disclosure, the second PCM switch circuit illustrated in FIGS. 7 and 8 comprises a first series connection of a first phase change memory (PCM) switch S1 and a second PCM switch S2, and a second series connection of a third PCM switch S3 and a fourth PCM switch S4. The first PCM switch S1, the second PCM switch S2, the third PCM switch S3, and the fourth PCM switch S4 may be implemented as illustrated in FIGS. 4A-4D. Each PCM switch (S1, S2, S3, S4) may have a respective pair of contact electrodes 50 as described with reference to FIGS. 4A-4D.

Referring collectively to FIGS. 4A-4D, 7, and 8, the node of a first contact electrode 50A of the first PCM switch S1 is electrically connected to the node of a fifth contact electrode 50E of the third PCM switch S3. The node of the third contact electrode 50C of the second PCM switch S2 is electrically connected to the second contact electrode 50B of the first PCM switch S1, and the node of the fourth contact electrode 50D of the second PCM switch S2 is connected to electrical ground. The node of the seventh contact electrode 50G of the fourth PCM switch S4 is electrically connected to the sixth contact electrode 50F of the third PCM switch S3, and the node of the eighth contact electrode 50H of the fourth PCM switch S4 is connected to electrical ground.

In the first operational mode, the node of the first contact electrode 50A of the first PCM switch S1 may be used as an RF signal input port, the node of the second contact electrode 50B of the first PCM switch S1 may be used as a first RF signal output port, and the node of the sixth contact electrode 50F may be used as a second RF signal output port. In the second operational mode, the node of the first contact electrode 50A of the first PCM switch S1 may be used as an RF signal output port, the node of the second contact electrode 50B of the first PCM switch S1 may be used as a first RF signal input port, and the node of the sixth contact electrode 50F may be used as a second RF signal input port. According to an aspect of the present disclosure, the first PCM switch S1 and the fourth PCM switch S4 are cross-coupled to be in the same state, i.e., an on state or an off state. The second PCM switch S2 and the third PCM switch S3 are cross-coupled to be in the same state, i.e., an off state or an on state. The first PCM switch S1 and the second PCM switch S2 are in complementary states. The third PCM switch S3 and the fourth PCM switch are in complementary states. In other words, if the first PCM switch S1 and the fourth PCM switch S4 are on, the second PCM switch S2 and the third PCM switch S3 are off, and vice versa.

The combination of the first PCM switch S1 and the second PCM switch S2 operates in the same manner as the first exemplary PCM switch circuit illustrated in FIGS. 5A and 5B, or in a reverse mode in which the input port and the output port are reversed. Further, the combination of the third PCM switch S3 and the fourth PCM switch S4 operates in the same manner as the first exemplary PCM switch illustrated in FIGS. 5A and 5B, or in a reverse mode in which the input port and the output port are reversed. In addition, the combination of the first PCM switch S1 and the second PCM switch S2 and the combination of the third PCM switch S3 and the fourth PCM switch S4 are coupled to each other so that only one combination of two PCM switches in a series connection provides a signal transmission path between a respective input port and a respective output port, while the other combination of two PCM switches in a series connection routes any signal to electrical ground. The noise from the inactivated combination of two PCM switches (i.e., the turned-off combination) is significantly less due to the routing of disconnected signals to electrical ground.

Figure 9:
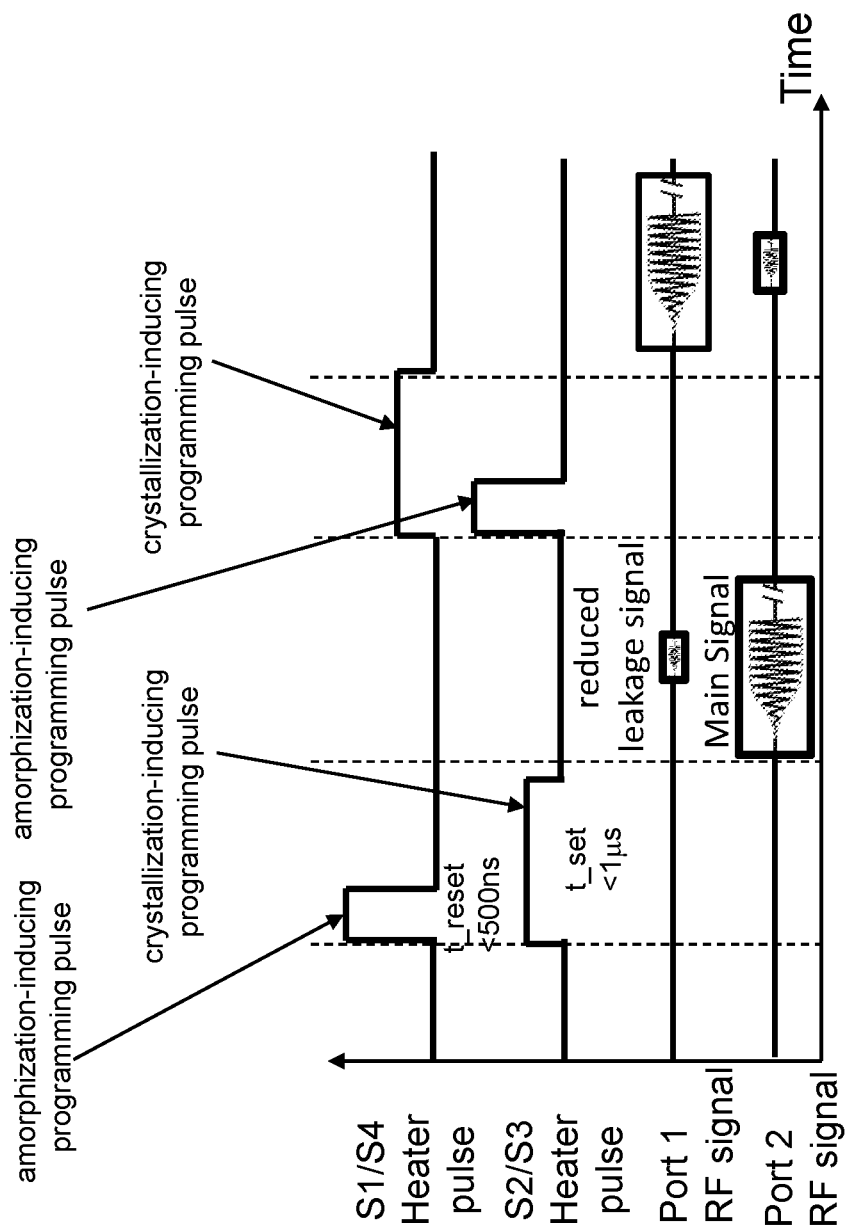
FIG. 9 is a timing diagram for the pulse patterns that are applied to the heaters of the four signal switches in the second PCM switch circuit.

Referring to FIG. 9, a timing diagram is illustrated for the pulse patterns that are applied to the heater lines 30 of the four signal switches in the second exemplary PCM switch circuit. According to an aspect of the present disclosure, the second exemplary PCM switch circuit may be configured so that complementary types of programming pulses are applied between a first group of heater lines including the first heater line within the first PCM switch S1 and the fourth heater line within the fourth PCM switch S4, and a second group of heater lines including the second heater line within the second PCM switch S2 and the third heater line within the third PCM switch S3.

In order to turn off the second PCM switch circuit, an amorphization-inducing programming pulse (also referred to as a reset pulse) may be applied to the first heater line within the first PCM switch S1 and the fourth heater line within the fourth PCM switch S4, and a crystallization-inducing programming pulse (also referred to as a set pulse) may be applied to the second PCM switch S2 and the third heater line within the third PCM switch S3. In order to turn on the first PCM switch circuit, a crystallization-inducing programming pulse may be applied to the first heater line within the first PCM switch S1 and the fourth heater line within the fourth PCM switch S4, and an amorphization-inducing programming pulse may be applied to the second PCM switch S2 and the third heater line within the third PCM switch S3.

Generally, clocks are not necessary for application of the complementary programming pulses. The transistors 700 within CMOS circuit 700 may be coupled to one another such that two type of programming pulses are generated simultaneously. According to an aspect of the present disclosure, sequential application of an amorphization-inducing programming pulse and a crystallization-inducing programming pulse may enhance isolation performance by increasing the impedance of the PCM switches in their respective off state. Generally, the duration of the amorphization-inducing programming pulse (i.e., a reset pulse) may be less than 500 ns, such as less than 100 ns, and the duration of the crystallization-inducing programming pulse (i.e., a set pulse) may be less than 1 microsecond, such as less than 800 ns.

Figure 10:
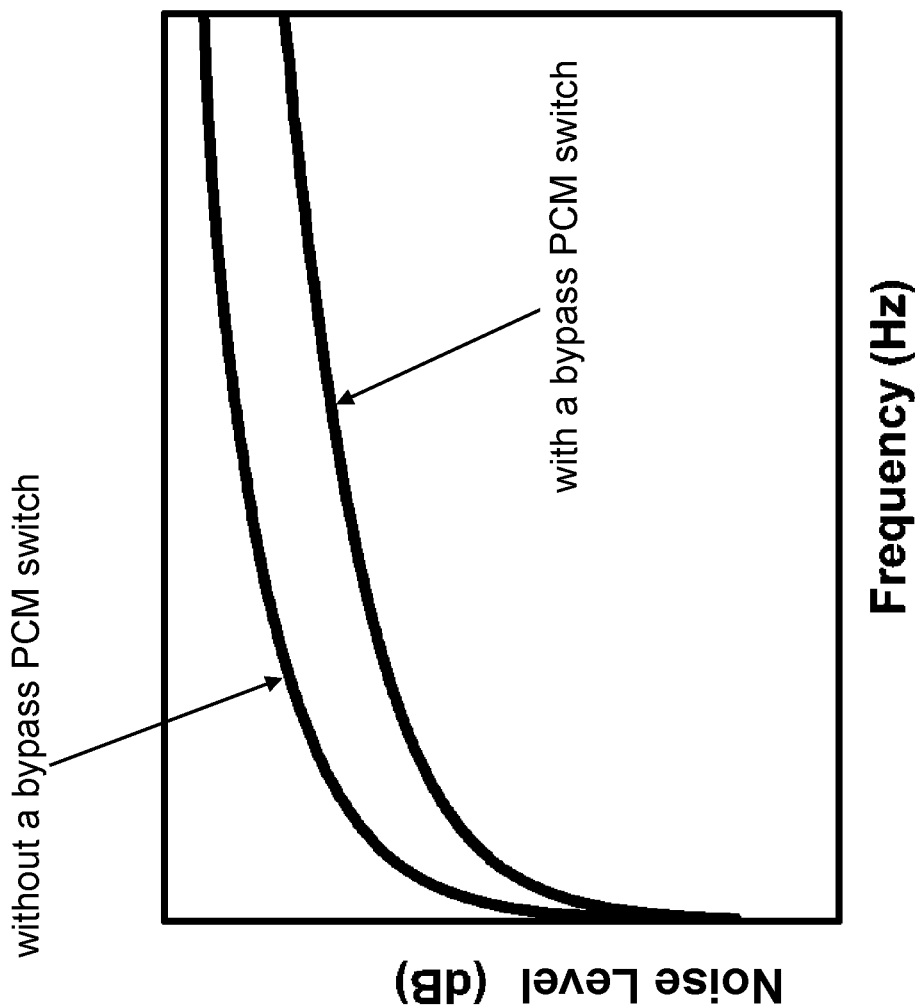
FIG. 10 is a graph illustrating the performance advantage of the PCM switches of the present disclosure.

Generally, the PCM switch circuits of various embodiments of the present disclosure may reduce noise in the output port by reducing parasitic coupling between the input port and the output port. The parasitic coupling may be reduced by providing a low impedance path between an input port and electrical ground and/or between an output node and electrical ground. The low impedance path is provided by a PCM switch (which is a bypass PCM switch) such as a second PCM switch S2 and/or a fourth PCM switch S4 described above. FIG. 10 schematically illustrates the effect of the bypass PCM switch in the PCM switch circuits of the present disclosure.

Figure 11:
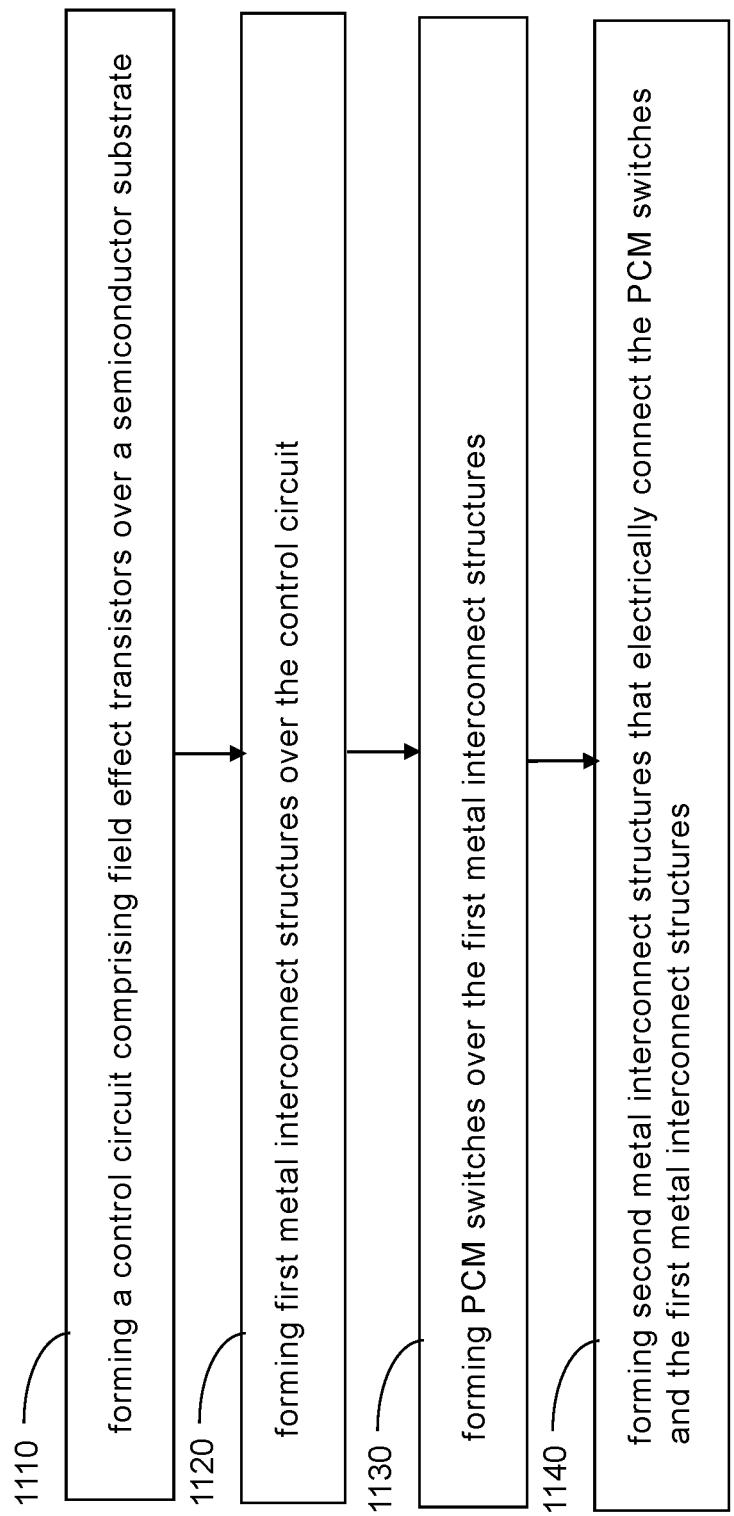
FIG. 11 is a flowchart that illustrates general processing steps for manufacturing a device structure according to embodiments of the present disclosure.

Referring to FIG. 11, a flowchart illustrates general processing steps for manufacturing device structures according to various embodiments of the present disclosure.

Referring to step 1110 and FIG. 1, a control circuit (such as a CMOS circuit 700) comprising field effect transistors 701 may be formed over a semiconductor substrate, such as the substrate 8 including a semiconductor material layer 9. Referring to step 1120 and FIG. 1, first metal interconnect structures (612, 618, 622, 628, 632, 638, 642, 648) may be formed over the control circuit.

Referring to step 1130 and FIGS. 2A, 2B, 3A, 3B, and 4A-4D, PCM switches (S1, S2, S3, S4) may be formed over the first metal interconnect structures (612, 618, 622, 628, 632, 638, 642, 648).

Referring to step 1140 and FIGS. 4A-4D and 5A-10, second metal interconnect structures (652, 653, 658, 659) may be formed, which electrically connect the PCM switches (S1, S2, S3, S4) and the first metal interconnect structures (612, 618, 622, 628, 632, 638, 642, 648).

Referring collectively to all drawings of the instant application and according to various embodiments of the present disclosure, a device structure comprising a first series connection of a first phase change memory (PCM) switch S1 and a second PCM switch S2 is provided. The first PCM switch S1 comprises a first heater line 30A, a first phase change material (PCM) line 40A located in proximity to the first heater line 30A, a first contact electrode 50A located on a first end of the first PCM line 40A, and a second contact electrode 50B located on a second end of the first PCM line 40A; the second PCM switch S2 comprises a second heater line 30B, a second PCM line 40B located in proximity to the second heater line 30B, a third contact electrode 50C located on a first end of the second PCM line 40B, and a fourth contact electrode 50D located on a second end of the second PCM line 40B; the second contact electrode 50B is electrically connected to the third contact electrode 50C; the fourth contact electrode 50D is electrically grounded; one of the first contact electrode 50A and the second contact electrode 50B comprises a first signal input port; and another of the first contact electrode 50A and the second contact electrode 50B comprises a first signal output port.

In one embodiment, the device structure comprises: a substrate 8 underlying the first PCM switch S1 and the second PCM switch S2; and dielectric material layers (601, 610, 620, 630, 640) and metal interconnect structures (612, 618, 622, 628, 632, 638, 642, 648) interposed between the substrate 8 and a combination of the first PCM switch S1 and the second PCM switch S2, wherein the first PCM switch S1 and the second PCM switch S2 are equidistant from a top surface of the substrate 8.

In one embodiment, the device structure comprises field effect transistors 701 located on the top surface of the substrate 8. A first subset of the field effect transistors 701 is electrically connected to the first heater line 30A; and a second subset of the field effect transistors 701 is electrically connected to the second heater line 30B.

In one embodiment, each of the first subset and the second subset is configured to generate a respective set of two types of programming pulses including an amorphization-inducing programming pulse that programs a respective heater line selected from the first heater line 30A and the second heater line 30B into a high resistivity state and a crystallization-inducing programming pulse that programs the respective heater line into a low resistivity state; and the first subset and the second subset are logically coupled such that one of the first subset and the second subset generates a respective amorphization-inducing programming pulse and another of the first subset and the second subset generates a respective crystallization-inducing programming pulse when the first subset and the second subset are activated for programming.

In one embodiment, the device structure comprises additional metal interconnect structures (652, 653, 658, 659) located at a same level as, or located above, the first PCM switch S1 and the second PCM switch S2, wherein the third contact electrode 50C is electrically connected to the second contact electrode 50B through a subset of the additional metal interconnect structures (652, 653, 658, 659).

In one embodiment, the subset of the additional metal interconnect structures (652, 653, 658, 659) comprises: an electrode contact via structure (such as a second electrode contact via structure 6522) contacting a top surface of the second contact electrode 50B; an additional electrode contact via structure (such as a third electrode contact via structure 6523) contacting a top surface of the third contact electrode 50C; and a metal line (such as a second metal line 6582) contacting a top surface of the electrode contact via structure and contacting a top surface of the additional electrode contact via structure.

In one embodiment, the first contact electrode 50A comprises the first RF input port; and the second contact electrode 50B comprises the first RF output port.

In one embodiment, the device structure comprises a second series connection of a third PCM switch S3 and a fourth PCM switch S4. In one embodiment, the third PCM switch S3 comprises a third heater line 30C, a third PCM line 40C located in proximity to the third heater line 30C, a fifth contact electrode 50E located on a first end of the third PCM line 40C, and a sixth contact electrode 50F located on a second end of the third PCM line 40C; the fourth PCM switch S4 comprises a fourth heater line 30D, a fourth PCM line 40D located in proximity to the fourth heater line 30D, a seventh contact electrode 50G located on a first end of the fourth PCM line 40D, and an eighth contact electrode 50H located on a second end of the fourth PCM line 40D; the fifth contact electrode 50E is electrically connected to the first contact electrode 50A; the sixth contact electrode 50F is electrically connected to the seventh contact electrode 50G; and the eighth contact electrode 50H is electrically grounded.

In one embodiment, the first contact electrode 50A comprises the first signal input port, the second contact electrode 50B comprises the first signal output port, and the sixth contact electrode 50F comprises an additional signal output port; or the first contact electrode 50A comprise the first signal output port, the second contact electrode 50B comprises the first signal input port, and the sixth contact electrode 50F comprises an additional signal input port.

In one embodiment, the first contact electrode 50A comprise the first signal output port; and the second contact electrode 50B comprises the first signal input port.

In one embodiment, the first PCM line 40A and the second PCM line 40B (and all other PCM lines (40C, 40D) have a same height; the first PCM line 40A (and the third PCM line 40C) has a first width; the second PCM line 40B (and the fourth PCM line 40D) has a second width; and the first width is greater than the second width.

According to an aspect of the present disclosure, a device structure is provided, which comprises: a first series connection of a first phase change memory (PCM) switch S1 and a second PCM switch S2; and a second series connection of a third PCM switch S3 and a fourth PCM switch S4, wherein: the first PCM switch S1 comprises a first heater line 30A, a first phase change material (PCM) line 40A located in proximity to the first heater line 30A, a first contact electrode 50A located on a first end of the first PCM line 40A, and a second contact electrode 50B located on a second end of the first PCM line 40A; the second PCM switch S2 comprises a second heater line 30B, a second PCM line 40B located in proximity to the second heater line 30B, a third contact electrode 50C located on a first end of the second PCM line 40B, and a fourth contact electrode 50D located on a second end of the second PCM line 40B; the third PCM switch S3 comprises a third heater line 30C, a third PCM line 40C located in proximity to the third heater line 30C, a fifth contact electrode 50E located on a first end of the third PCM line 40C, and a sixth contact electrode 50F located on a second end of the third PCM line 40C; the fourth PCM switch S4 comprises a fourth heater line 30D, a fourth PCM line 40D located in proximity to the fourth heater line 30D, a seventh contact electrode 50G located on a first end of the fourth PCM line 40D, and an eighth contact electrode 50H located on a second end of the fourth PCM line 40D; the first contact electrode 50A is electrically connected to the fifth contact electrode 50E; the second contact electrode 50B is electrically connected to the third contact electrode 50C; the sixth contact electrode 50F is electrically connected to the seventh contact electrode 50G; the fourth contact electrode 50D and the eighth contact electrode 50H are electrically grounded; the device structure is in a configuration selected from: a first configuration in which the first contact electrode 50A comprises an radio-frequency (RF) signal input port, the second contact electrode 50B comprises a first RF signal output port, and the third contact electrode 50C comprises a second RF signal output port; and a second configuration in which the first contact electrode 50A comprises an radio-frequency (RF) signal output port, the second contact electrode 50B comprises a first RF signal input port, and the third contact electrode 50C comprises a second RF signal input port.

In one embodiment, the device structure comprises: a substrate 8 underlying the first PCM switch S1, the second PCM switch S2, the third PCM switch S3, and the fourth PCM switch S4; and dielectric material layers (601, 610, 620, 630, 640) and metal interconnect structures (612, 618, 622, 628, 632, 638, 642, 648) interposed between the substrate 8 and a combination of the first PCM switch S1, the second PCM switch S2, the third PCM switch S3, and the fourth PCM switch S4, wherein the first PCM switch S1, the second PCM switch S2, the third PCM switch S3, and the fourth PCM switch S4 are equidistant from a top surface of the substrate 8.

In one embodiment, the device structure comprises field effect transistors 701 located on the top surface of the substrate 8. A first subset of the field effect transistors 701 is electrically connected to the first heater line 30A and to the fourth heater line 30D; and a second subset of the field effect transistors 701 is electrically connected to the second heater line 30B and to the third heater line 30C.

In one embodiment, the device structure comprises a programming circuit located on the top surface of the substrate 8 and configurated to electrically bias the first heater line 30A, the second heater line 30B, the third heater line 30C, and the fourth heater line 30D. A first end of the first PCM line 40A and a first end of the fourth PCM line 40D are electrically connected to a first node the programming circuit; a second end of the first PCM line 40A and a second end of the fourth PCM line 40D are electrically connected to a second node of the programming circuit; a first end of the second PCM line 40B and a first end of the third PCM line 40C are electrically connected to a third node of the programming circuit; and a second end of the second PCM line 40B and a second end of the third PCM line 40C are electrically connected to a fourth node of the programming circuit.

In one embodiment, the programming circuit is configurated to generate a pulse pattern selected from: a first pulse pattern in which an amorphization-inducing programming pulse is applied across the first node and the second node of the programming circuit and a crystallization-inducing programming pulse is applied across the third node and the fourth node of the programming circuit; and a second pulse pattern in which the amorphization-inducing programming pulse is applied across the third node and the fourth node of the programming circuit and the crystallization-inducing programming pulse is applied across the first node and the second node of the programming circuit. The amorphization-inducing programming pulse has a magnitude and a duration that that programs a respective pair of heater lines 30 selected from the first, second, third, and fourth heater lines 30 into a respective high resistivity state; and the crystallization-inducing programming pulse has a magnitude and a duration that programs the respective heater lines 30 selected from the first, second, third, and fourth heater lines 30 into a respective low resistivity state.

According to another aspect of the present disclosure, a circuit is provided, which comprises: a first series connection of a first phase change memory (PCM) switch S1 and a second PCM switch S2; and a programming circuit located on a top surface of a substrate 8 that underlies the first series connection, wherein: the first PCM switch S1 comprises a first heater line 30A, a first phase change material (PCM) line 40A located in proximity to the first heater line 30A, a first contact electrode 50A located on a first end of the first PCM line 40A, and a second contact electrode 50B located on a second end of the first PCM line 40A; the second PCM switch S2 comprises a second heater line 30B, a second PCM line 40B located in proximity to the second heater line 30B, a third contact electrode 50C located on a first end of the second PCM line 40B, and a fourth contact electrode 50D located on a second end of the second PCM line 40B; the second contact electrode 50B is electrically connected to the third contact electrode 50C; the fourth contact electrode 50D is electrically grounded; one of the first contact electrode 50A and the second contact electrode 50B comprises an radio-frequency (RF) signal input port; another of the first contact electrode 50A and the second contact electrode 50B comprises an RF signal output port; the programming circuit is configurated to apply a set of complementary programming pluses across the first heater line 30A and the second heater line 30B, the set of complementary programming pulses comprising an amorphization-inducing programming pulse that induces a high resistivity state in one of the first PCM line 40A and the second PCM line 40B and a crystallization-inducing programming pulse that induces a low resistivity state in another of the first PCM line 40A and the second PCM line 40B.

In one embodiment, the circuit comprises a second series connection of a third PCM switch S3 and a fourth PCM switch S4. The third PCM switch S3 comprises a third heater line 30C, a third PCM line 40C located in proximity to the third heater line 30C, a fifth contact electrode 50E located on a first end of the third PCM line 40C, and a sixth contact electrode 50F located on a second end of the third PCM line 40C; the fourth PCM switch S4 comprises a fourth heater line 30D, a fourth PCM line 40D located in proximity to the fourth heater line 30D, a seventh contact electrode 50G located on a first end of the fourth PCM line 40D, and an eighth contact electrode 50H located on a second end of the fourth PCM line 40D; the first contact electrode 50A is electrically connected to the fifth contact electrode 50E; the sixth contact electrode 50F is electrically connected to the seventh contact electrode 50G; the eighth contact electrode 50H is electrically grounded; and the sixth contact electrode 50F comprises an additional RF signal input port or an additional RF signal output port.

In one embodiment, the programming circuit is configured to apply a pulse pattern of a first type across the first heater line 30A and the fourth heater line 30D during a programming operation; the programming circuit is configurated to apply a pulse pattern of a second type across the second heater line 30B and the third heater line 30C during the programming operation; and one of the pulse pattern of the first type and the pulse pattern of the second type comprises the amorphization-inducing programming pulse and another of the pulse pattern of the first type and the pulse pattern of the second type comprises the crystallization-inducing programming pulse.

In one embodiment, a combination of the first series connection and the second series connection is in a configuration selected from: a first configuration in which the first contact electrode 50A comprises an radio-frequency (RF) signal input port, the second contact electrode 50B comprises a first RF signal output port, and the third contact electrode 50C comprises a second RF signal output port; and a second configuration in which the first contact electrode 50A comprises an radio-frequency (RF) signal output port, the second contact electrode 50B comprises a first RF signal input port, and the third contact electrode 50C comprises a second RF signal input port.

The various embodiments of the present disclosure provide a PCM switch circuit including at least one series connection of two PCM switches. In an off state, the main signal switch blocks signal transmission between an input port and an output port, while the bypass switch connects electrical ground to the input node or to the output node. The PCM line of the main signal switch may be wider than the PCM line of the bypass switch to reduce the impedance of the main signal switch while economically utilizing the total device area by using a lesser area for the bypass switch (through use of a smaller PCM line for the bypass switch). The PCM switch circuits of the present disclosure provide enhanced signal isolation performance when the PCM switch circuit is in an off state. The programming circuit is self-clocking, and may synchronize the amorphization-inducing programming pulse and the crystallization-inducing programming pulse across two sets of PCM switches. Further signal interference between multiple channels may be reduced in the PCM switch circuits of the present disclosure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device structure comprising a first series connection of a first phase change memory (PCM) switch and a second PCM switch, wherein:
   the first PCM switch comprises a first phase change material (PCM) line, a first contact electrode located on a first end of the first PCM line, and a second contact electrode located on a second end of the first PCM line;
   the second PCM switch comprises a second PCM line, a third contact electrode located on a first end of the second PCM line, and a fourth contact electrode located on a second end of the second PCM line;
   the second contact electrode is electrically connected to the third contact electrode;
   the fourth contact electrode is electrically grounded;
   one of the first contact electrode and the second contact electrode comprises a signal input port;
   another of the first contact electrode and the second contact electrode comprises a signal output port;
   the first PCM line and the second PCM line have a same height;
   the first PCM line has a first width;
   the second PCM line has a second width; and
   the first width is greater than the second width.

2. The device structure of claim 1, further comprising:
   a substrate underlying the first PCM switch and the second PCM switch; and
   dielectric material layers and metal interconnect structures interposed between the substrate and a combination of the first PCM switch and the second PCM switch, wherein the first PCM switch and the second PCM switch are equidistant from a top surface of the substrate.

3. The device structure of claim 2, wherein:
   the first PCM switch comprises a first heater line located in proximity to the first PCM line;
   the second PCM switch comprises a second heater line located in proximity second PCM line;
   the device structure further comprises field effect transistors located on the top surface of the substrate;
   a first subset of the field effect transistors is electrically connected to the first heater line; and
   a second subset of the field effect transistors is electrically connected to the second heater line.

4. The device structure of claim 3, wherein:
   each of the first subset and the second subset is configured to generate a respective set of two types of programming pulses including an amorphization-inducing programming pulse that programs a respective heater line selected from the first heater line and the second heater line into a high resistivity state and a crystallization-inducing programming pulse that programs the respective heater line into a low resistivity state; and
   the first subset and the second subset are logically coupled such that one of the first subset and the second subset generates a respective amorphization-inducing programming pulse and another of the first subset and the second subset generates a respective crystallization-inducing programming pulse when the first subset and the second subset are activated for programming.

5. The device structure of claim 2, further comprising additional metal interconnect structures located at a same level as, or located above, the first PCM switch and the second PCM switch, wherein the third contact electrode is electrically connected to the second contact electrode through a subset of the additional metal interconnect structures, wherein the subset of the additional metal interconnect structures comprises:
   an electrode contact via structure contacting a top surface of the second contact electrode;
   an additional electrode contact via structure contacting a top surface of the third contact electrode; and
   a metal line contacting a top surface of the electrode contact via structure and contacting a top surface of the additional electrode contact via structure.

6. The device structure of claim 1, wherein:
   the first contact electrode comprises the first signal input port;
   the second contact electrode comprises the first signal output port;
   the first PCM switch comprises a first heater line located in proximity to the first PCM line; and
   the second PCM switch comprises a second heater line located in proximity second PCM line.

7. The device structure of claim 6, further comprising a second series connection of a third PCM switch and a fourth PCM switch, wherein:
   the third PCM switch comprises a third heater line, a third PCM line located in proximity to the third heater line, a fifth contact electrode located on a first end of the third PCM line, and a sixth contact electrode located on a second end of the third PCM line;

the fourth PCM switch comprises a fourth heater line, a fourth PCM line located in proximity to the fourth heater line, a seventh contact electrode located on a first end of the fourth heater line, and an eighth contact electrode located on a second end of the fourth heater line;

the fifth contact electrode is electrically connected to the first contact electrode;

the sixth contact electrode is electrically connected to the seventh contact electrode; and the eighth contact electrode is electrically grounded.

8. The device structure of claim 7, wherein:

the first contact electrode comprises the first signal input port, the second contact electrode comprises the first signal output port, and the sixth contact electrode comprises an additional signal output port; or the first contact electrode comprises the first signal output port, the second contact electrode comprises the first signal input port, and the sixth contact electrode comprises an additional signal input port.

9. The device structure of claim 1, wherein:

one of the first contact electrode and the second contact electrode comprises an radio-frequency (RF) signal input port;

another of the first contact electrode and the second contact electrode comprises an RF signal output port; and the device structure further comprises a programming circuit comprising the first subset of the field effect transistors and the second subset of the field effect transistors, and is configurated to apply a set of complementary programming pluses across the first heater line and the second heater line, the set of complementary programming pulses comprising an amorphization-inducing programming pulse that induces a high resistivity state in one of the first PCM line and the second PCM line and a crystallization-inducing programming pulse that induces a low resistivity state in another of the first PCM line and the second PCM line.

10. A device structure comprising:

a first series connection of a first phase change memory (PCM) switch and a second PCM switch; and a second series connection of a third PCM switch and a fourth PCM switch, wherein:

the first PCM switch comprises a first heater line, a first phase change material (PCM) line located in proximity to the first heater line, a first contact electrode located on a first end of the first PCM line, and a second contact electrode located on a second end of the first PCM line;

the second PCM switch comprises a second heater line, a second PCM line located in proximity to the second heater line, a third contact electrode located on a first end of the second PCM line, and a fourth contact electrode located on a second end of the second PCM line;

the third PCM switch comprises a third heater line, a third PCM line located in proximity to the third heater line, a fifth contact electrode located on a first end of the third PCM line, and a sixth contact electrode located on a second end of the third PCM line;

the fourth PCM switch comprises a fourth heater line, a fourth PCM line located in proximity to the fourth heater line, a seventh contact electrode located on a first end of the fourth heater line, and an eighth contact electrode located on a second end of the fourth heater line;

the first contact electrode is electrically connected to the fifth contact electrode;

the second contact electrode is electrically connected to the third contact electrode;

the sixth contact electrode is electrically connected to the seventh contact electrode;

the fourth contact electrode and the eighth contact electrode are electrically grounded;

the first PCM line and the second PCM line have a same height;

the first PCM line has a first width;

the second PCM line has a second width; and the first width is greater than the second width.

11. The device structure of claim 10, wherein the device structure is in a configuration selected from:

a first configuration in which the first contact electrode comprises an radio-frequency (RF) signal input port, the second contact electrode comprises a first RF signal output port, and the third contact electrode comprises a second RF signal output port; or a second configuration in which the first contact electrode comprises an radio-frequency (RF) signal output port, the second contact electrode comprises a first RF signal input port, and the third contact electrode comprises a second RF signal input port.

12. The device structure of claim 10, further comprising:

a substrate underlying the first PCM switch, the second PCM switch, the third PCM switch, and the fourth PCM switch; and dielectric material layers and metal interconnect structures interposed between the substrate and a combination of the first PCM switch, the second PCM switch, the third PCM switch, and the fourth PCM Switch, wherein the first PCM switch, the second PCM switch, the third PCM switch, and the fourth PCM switch are equidistant from a top surface of the substrate.

13. The device structure of claim 12, further comprising field effect transistors located on the top surface of the substrate, wherein:

a first subset of the field effect transistors is electrically connected to the first heater line and to the fourth heater line; and a second subset of the field effect transistors is electrically connected to the second heater line and to the third heater line.

14. The device structure of claim 13, wherein:

each of the first subset and the second subset is configured to generate a respective set of two types of programming pulses including an amorphization-inducing programming pulse that programs a respective heater line selected from the first heater line and the second heater line into a high resistivity state and a crystallization-inducing programming pulse that programs the respective heater line into a low resistivity state; and the first subset and the second subset are logically coupled such that one of the first subset and the second subset generates a respective amorphization-inducing programming pulse and another of the first subset and the second subset generates a respective crystallization-inducing programming pulse when the first subset and the second subset are activated for programming.

15. The device structure of claim 12, further comprising a programming circuit located on the top surface of the substrate and configured to electrically bias the first heater line, the second heater line, the third heater line, and the fourth heater line, wherein:
the first end of the first PCM line and the first end of the fourth heater line are electrically connected to a first node the programming circuit;
the second end of the first PCM line and the second end of the fourth heater line are electrically connected to a second node of the programming circuit;
the first end of the second PCM line and the first end of the third PCM line are electrically connected to a third node of the programming circuit; and
the second end of the second PCM line and the second end of the third PCM line are electrically connected to a fourth node of the programming circuit.

16. The device structure of claim 15, wherein the programming circuit is configured to generate a pulse pattern selected from:
a first pulse pattern in which an amorphization-inducing programming pulse is applied across the first node and the second node of the programming circuit and a crystallization-inducing programming pulse is applied across the third node and the fourth node of the programming circuit; or
a second pulse pattern in which the amorphization-inducing programming pulse is applied across the third node and the fourth node of the programming circuit and the crystallization-inducing programming pulse is applied across the first node and the second node of the programming circuit, wherein:
the amorphization-inducing programming pulse has a magnitude and a duration that programs a respective pair of heater lines selected from the first, second, third, and fourth heater lines into a respective high resistivity state; and
the crystallization-inducing programming pulse has a magnitude and a duration that programs the respective pair of heater lines selected from the first, second, third, and fourth heater lines into a respective low resistivity state.

17. A circuit, comprising:
a first series connection of a first phase change memory (PCM) switch and a second PCM switch; and
a programming circuit located on a top surface of a substrate that underlies the first series connection, wherein:
the first PCM switch comprises a first heater line, a first phase change material (PCM) line located in proximity to the first heater line, a first contact electrode located on a first end of the first PCM line, and a second contact electrode located on a second end of the first PCM line;
the second PCM switch comprises a second heater line, a second PCM line located in proximity to the second heater line, a third contact electrode located on a first end of the second PCM line, and a fourth contact electrode located on a second end of the second PCM line;
the second contact electrode is electrically connected to the third contact electrode;
the fourth contact electrode is electrically grounded;
one of the first contact electrode and the second contact electrode comprises an radio-frequency (RF) signal input port;
another of the first contact electrode and the second contact electrode comprises an RF signal output port; and
the programming circuit is configured to apply a set of complementary programming pluses across the first heater line and the second heater line, the set of complementary programming pulses comprising an amorphization-inducing programming pulse that induces a high resistivity state in one of the first PCM line and the second PCM line and a crystallization-inducing programming pulse that induces a low resistivity state in another of the first PCM line and the second PCM line.

18. The circuit of claim 17, further comprising a second series connection of a third PCM switch and a fourth PCM switch, wherein:
the third PCM switch comprises a third heater line, a third PCM line located in proximity to the third heater line, a fifth contact electrode located on a first end of the third PCM line, and a sixth contact electrode located on a second end of the third PCM line;
the fourth PCM switch comprises a fourth heater line, a fourth PCM line located in proximity to the fourth heater line, a seventh contact electrode located on a first end of the fourth heater line, and an eighth contact electrode located on a second end of the fourth heater line;
the first contact electrode is electrically connected to the fifth contact electrode;
the sixth contact electrode is electrically connected to the seventh contact electrode;
the eighth contact electrode is electrically grounded; and
the sixth contact electrode comprises an additional RF signal input port or an additional RF signal output port.

19. The circuit of claim 18, wherein:
the programming circuit is configured to apply a pulse pattern of a first type across the first heater line and the fourth heater line during a programming operation;
the programming circuit is configured to apply a pulse pattern of a second type across the second heater line and the third heater line during the programming operation; and
one of the pulse pattern of the first type and the pulse pattern of the second type comprises the amorphization-inducing programming pulse and another of the pulse pattern of the first type and the pulse pattern of the second type comprises the crystallization-inducing programming pulse.

20. The circuit of claim 18, wherein a combination of the first series connection and the second series connection is in a configuration selected from:
a first configuration in which the first contact electrode comprises an radio-frequency (RF) signal input port, the second contact electrode comprises a first RF signal output port, and the third contact electrode comprises a second RF signal output port; and
a second configuration in which the first contact electrode comprises an radio-frequency (RF) signal output port, the second contact electrode comprises a first RF signal input port, and the third contact electrode comprises a second RF signal input port.

* * * * *